US007246932B2

(12) United States Patent
Burtsev et al.

(10) Patent No.: US 7,246,932 B2
(45) Date of Patent: Jul. 24, 2007

(54) DATA DISPLAY DEVICE

(75) Inventors: Vladimir Nikolayevich Burtsev, Kharkov (UA); Valery Nikolayevich Burtsev, Kharkov (UA); Oleksandr Petrovich Stetsenko, Kharkov (UA)

(73) Assignee: Wytec Holding B.V. (NL)

( * ) Notice: Subject to any disclaimer, the term of this patent is extended or adjusted under 35 U.S.C. 154(b) by 0 days.

(21) Appl. No.: 10/468,962

(22) PCT Filed: Feb. 22, 2002

(86) PCT No.: PCT/NL02/00117

§ 371 (c)(1),
(2), (4) Date: Jan. 23, 2004

(87) PCT Pub. No.: WO02/066893

PCT Pub. Date: Aug. 29, 2002

(65) Prior Publication Data

US 2004/0114344 A1    Jun. 17, 2004

(30) Foreign Application Priority Data

Feb. 23, 2001  (UA) .............................. 2001021292

(51) Int. Cl.
 *F21V 7/04* (2006.01)
(52) U.S. Cl. .................. 362/616; 362/27; 362/601; 362/612; 362/619; 40/546
(58) Field of Classification Search .............. 362/31, 362/330, 554–556, 26–27, 812, 600–601, 362/612–613, 615–616, 621, 619; 40/546–547
See application file for complete search history.

(56) References Cited

U.S. PATENT DOCUMENTS

| 1,930,359 | A |   | 10/1933 | Hilgenberg |
| 2,551,622 | A | * | 5/1951  | Mohr ........................... 40/546 |
| 2,623,313 | A | * | 12/1952 | Fuchs .......................... 40/546 |
| 3,548,337 | A | * | 12/1970 | Gates et al. .................. 372/16 |
| 3,827,791 | A | * | 8/1974  | Mecklenborg ............... 352/69 |
| 4,279,089 | A | * | 7/1981  | Murakami .................... 40/547 |
| 4,310,219 | A | * | 1/1982  | Jaccard ....................... 359/599 |
| 4,385,343 | A | * | 5/1983  | Plumly ......................... 362/31 |
| 4,845,596 | A | * | 7/1989  | Mouissie ..................... 362/560 |
| 4,885,663 | A | * | 12/1989 | Parker ......................... 362/561 |
| 4,961,617 | A | * | 10/1990 | Shahidi et al. ............... 385/31 |
| 4,974,354 | A | * | 12/1990 | Hembrook, Jr. ............. 40/546 |
| 4,989,933 | A | * | 2/1991  | Duguay et al. .............. 385/31 |
| 5,005,108 | A | * | 4/1991  | Pristash et al. .............. 362/31 |
| 5,009,019 | A | * | 4/1991  | Erlendsson et al. ......... 40/541 |
| 5,027,258 | A | * | 6/1991  | Schoniger et al. ........... 362/31 |
| 5,036,435 | A | * | 7/1991  | Tokuda et al. ............... 362/31 |

(Continued)

FOREIGN PATENT DOCUMENTS

DE      296 00 431 U1    3/1996

(Continued)

*Primary Examiner*—Sandra O'Shea
*Assistant Examiner*—Jason Moon Han
(74) *Attorney, Agent, or Firm*—The Webb Law Firm

(57) ABSTRACT

A data display device including a light-guide element made of an optically transparent material having at least two polished surfaces faced to one another, whereby at least one surface contains at least one gravure forming a diffuse-reflective character, and a light source arranged close to the light-guide element to illuminate said character.

16 Claims, 31 Drawing Sheets

U.S. PATENT DOCUMENTS

| | | | | |
|---|---|---|---|---|
| 5,070,431 | A * | 12/1991 | Kitazawa et al. | 362/31 |
| 5,075,826 | A * | 12/1991 | Lan | 362/541 |
| 5,106,181 | A * | 4/1992 | Rockwell, III | 385/2 |
| 5,124,890 | A * | 6/1992 | Choi et al. | 362/27 |
| 5,136,483 | A * | 8/1992 | Schoniger et al. | 362/545 |
| 5,138,783 | A * | 8/1992 | Forsse | 40/546 |
| 5,165,187 | A * | 11/1992 | Shahidi-Hamedani et al. | 40/547 |
| 5,276,591 | A * | 1/1994 | Hegarty | 362/31 |
| 5,440,460 | A * | 8/1995 | Melberg | 362/101 |
| 5,444,932 | A * | 8/1995 | Jeroma | 40/564 |
| 5,536,558 | A * | 7/1996 | Shelton | 428/167 |
| 5,555,329 | A * | 9/1996 | Kuper et al. | 385/36 |
| 5,572,818 | A * | 11/1996 | Churchill | 40/547 |
| 5,664,862 | A * | 9/1997 | Redmond et al. | 362/31 |
| 5,779,337 | A * | 7/1998 | Saito et al. | 362/31 |
| 5,786,665 | A * | 7/1998 | Ohtsuki et al. | 313/512 |
| 5,854,872 | A * | 12/1998 | Tai | 385/133 |
| 6,031,958 | A * | 2/2000 | McGaffigan | 385/146 |
| 6,048,083 | A * | 4/2000 | McDermott | 362/337 |
| 6,053,621 | A * | 4/2000 | Yoneda | 362/245 |
| 6,183,099 | B1 * | 2/2001 | Garay et al. | 362/26 |
| 6,199,987 | B1 * | 3/2001 | Haba et al. | 353/34 |
| 6,250,767 | B1 * | 6/2001 | Kusafuka et al. | 362/31 |
| 6,288,700 | B1 * | 9/2001 | Mori | 345/102 |
| 6,308,444 | B1 * | 10/2001 | Ki | 40/546 |
| 6,409,361 | B1 * | 6/2002 | Ikeda | 362/240 |
| 6,454,437 | B1 * | 9/2002 | Kelly | 362/246 |
| 6,536,909 | B1 * | 3/2003 | Azorin | 362/31 |
| 6,648,486 | B2 * | 11/2003 | Harbers et al. | 362/31 |
| 6,667,582 | B1 * | 12/2003 | Procter | 315/185 R |
| 6,733,147 | B2 * | 5/2004 | Wang et al. | 362/26 |

FOREIGN PATENT DOCUMENTS

HU     205 440 B     6/1990

* cited by examiner

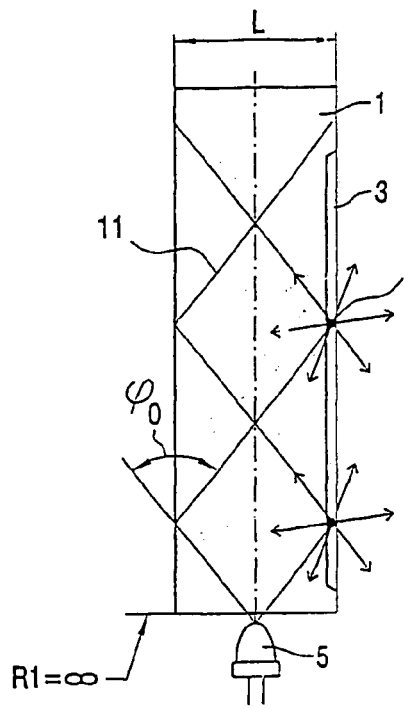
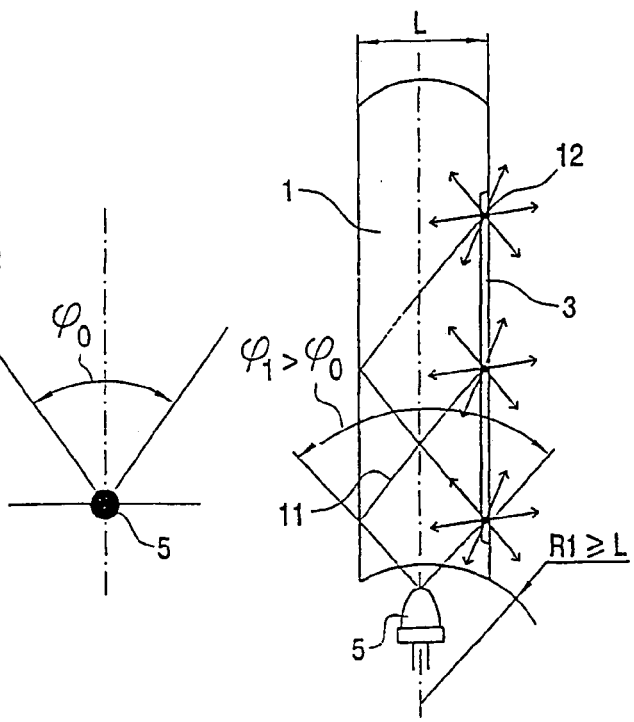
FIG. 10    FIG. 11
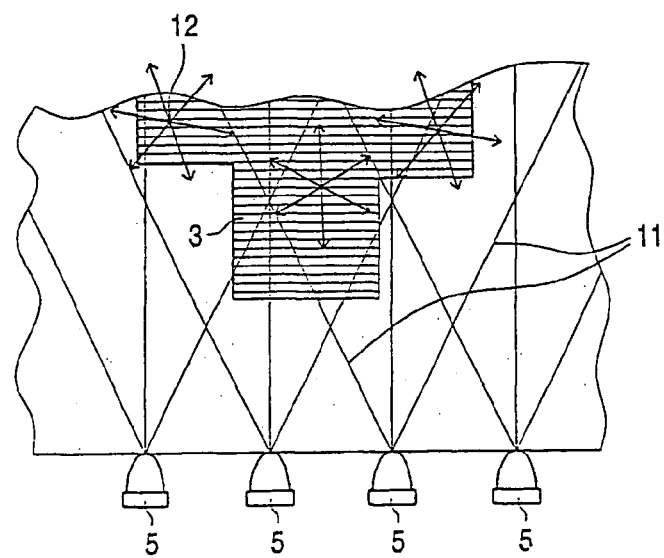
FIG. 12

DATA DISPLAY DEVICE

BACKGROUND OF THE INVENTION

1. Field of the Invention

The invention relates to a data display device including a light-guide element made of an optically transparent material having at least two polished surfaces faced to one another, whereby at least one surface contains at least one gravure forming a diffuse-reflective character, and a light source arranged close to the light-guide element to illuminate said character.

2. Description of the Prior Art

This invention is in the class of illumination engineering as well as in the class of advertising-information technologies. The claimed device may find its application in architecture as interior lamps doubling for functions of decorative luminaries.

The principle of action of the claimed device is based on well-known laws of geometric optics. Among these laws are:

1) the law of conductivity of light beams in an optically transparent media having a refractive index $n_1 > 1.0$, these media being in contact with-another medium having a refractive index $n_2$, with $n_1 > n_2$, for example, air ($n_2 = 1.0$);
2) the law of diffuse reflection of light beams from local deformations of polished surfaces.

Due to the condition $n_1 > n_2$ and owing to the polished reflecting surface, light beams do not escape the light-guide media if the condition of a limit angle of complete internal reflection is met (N. S. Kapany. Fiber Optics. Principles and Applications. Academic Press. N.Y. 1967).

What makes the claimed device the issue of the day is a new field of its application different from advertising-information purposes, by virtue of a fuller use of potentialities inherent in light-guide properties of optically transparent materials.

In advertising-information technologies, an extensive use is made of information screens called "Acryllights" produced by many advertising companies. All known "Acryllights" are made according to a uniform design of a device which comprises a light-guide element made of an optically transparent material having polished flat surfaces in the form of a light-guide plate (of a laminar rectangular shape), one of the surfaces being furnished with a set of engraved characters illuminated laterally through a polished surface by means of a light source. A principal drawback of the known device lies in its structural imperfection as dictated by a traditional approach to an information screen thought of as a plane. Such an approach comes into an apparent conflict with laws of light conductivity. These laws endow a light-guide element with "freedom of choosing any shape other than a rectilinear one" providing that the condition $n_1 > n_2$ and the condition of full internal reflection are met. Another drawback of the device known from the art is associated with the use of luminescent light sources in "Acryllights", above all in the form of tubes that are matched in length to the size of the light-guide plate. Diameters of the tube luminescent light sources exceed the thickness of the light-guide element, so the effectiveness of the lighting of diffuse-reflecting characters is low. Also, the size of luminescent light sources prevents some light-guide elements from being used in one unit.

The object of the invention is to procure a device for displaying data with enhanced visualization possibilities in respect to a data display device known in the art.

SUMMARY OF THE INVENTION

The above object is achieved by a data display device as mentioned above, characterized in that the device also includes: at least one additional light-guide element made of an optically transparent material having at least two polished surfaces faced to one another, whereby at least one surface contains at least one gravure forming a diffuse-reflective character, and at least one additional light source arranged to illuminate said diffuse-reflective character, whereby said light-guide elements being mounted at a distance one from each another such that the minimum distance between the guide-elements exceeds the red-light wavelength and each light source is being optically isolated from each another. Essential for the claimed device are the characterizing features namely introduction of extra light-guide elements conforming to the existing light-guide element and having (air) gaps between them, in combination with the use of light sources—preferably point light sources such as Light Emitting Diodes (LED's) and lasers—united in light-isolated groups according to the number of light-guide elements. So, the feature of conformity (similarity) of two and more light-guide elements generally dictates the use of curvilinear shapes within a single design. The presence of an air gap between light-guide elements guarantees a minor reflection of light-beams from the polished surfaces. (N. S. Kapany, Fiber Optics, Principles and Applications, Academic Press. N.Y. 1967) With curvilinear elements as well as with rectilinear elements, point light sources ensure highly effective illumination and provide a possibility to follow a curvilinear outline of any number of light-guide elements in a unit. Light isolation of groups of point light sources makes it possible to illuminate each light-guide element separately. Using the claimed device for demonstration of information makes it possible to achieve a benefit consisting in expansion of the device applications, in increasing the information capacity, in reducing power input and in adding to the failure operating time through the improvement of the device. There is a casual relationship between the benefit of the invention and distinguishing features of the claimed device as the feature of introduction of additional light-guide elements in combination with the feature of introduction of conforming light-guide elements ensures expansion of the device applications and provides an increase in information capacity of the claimed device due to making additional diffuse-reflective characters on the surfaces.

A mentioned above consists each light source of multiple point light sources. Small-sized point light sources used for illumination of diffuse-reflective characters make it possible to improve effectiveness of filling-in the internal volume of a light-guide element with light beams. Due to their size some few point light sources may be placed on small areas thus providing multiprogramming modes of their "on-off" action, which is effected in the device by means of the electronic programmed control unit. Accordingly, the distinguishing features of the claimed device are necessary and sufficient to achieve the benefit of the invention, with the said features being under legal protection in full measure.

Light-guide elements on the point source side are made curvilinear, with the curvature radius being no more than the thickness of the light-guide element. This is an additional feature specifying the structural possibility to widen the angle of the radiation directivity diagram of the point light sources. This feature is aimed at improving the effectiveness in illuminating a light-guide element while using highly intensive narrow-beam light sources. Restriction to the curvature radius is a structural parameter. All the light-guide elements of the claimed device are made curvilinear. This is an additional feature specifying conformity (similarity) of light-guide elements that may be united in a single light-guide unit.

In an embodiment of the invention the device comprises an electronic programmed unit electrically connected to said point light sources to control said point light sources. An advantage of the electronic programmed is that data can be displayed in numerous ways. For example, the data can be displayed in a dynamic way and/or in an three-dimensional way by switching specific point light sources on or off during specific times.

In another embodiment of the invention the point light sources in the form of solid-state semi-conductor light diodes (LED) are arranged in groups according to the number of light-guide elements relates to an essential distinguishing feature—"a point light source". A doubtless advantage of light diodes, alongside with their small size, is their high intensity of radiation and various spectra of glow plus high reliability.

The light produced by said at least one light source is preferably guided by multiple fiber-optical light guides to the corresponding light-guide element. In an specific embodiment a rotatable (multicolored) light filter can be placed between said light source and said fiber-optical light guides. The light that is directed to the light-guide element can be considered as a multiplicity of individual point light sources. This characteristic specifies an essential feature of the presence of point light sources, which makes it possible to tackle some problems associated with an increase in intensity of illumination of diffuse-reflective characters in the device, where as changing the spectral composition of radiation is effected by means of the said set of moveable light filters collected in a colourgramme. Most light diodes designed for illumination are highly intensive and their angle of the directivity diagram is not over 45°. With such light diodes produced by the Hewlett Packard Co. (Electronic components 'Hewlett Packard'. Concise catalogue. 1999. P. 3–7), a problem may arise in connection with redistribution of light radiation in favor of mirror-reflective components. For this problem to be solved, the surface of light-guide elements on the side of the point light sources is made oblique at an angle $$\phi = 90° \pm A$$

where A is an angular parameter selected out of the interval of values $0° \leq A \leq U/2$, where U is an angle of the directivity diagram of point light sources.

Due to this declinations, the majority of axial beams of a light diode strike upon the polished side of a light-guide element at an angle equal to or lesser than the angle Uc. The angle Uc is the angle of full internal reflection at the interface of an optical medium having a gradient of refraction indices. Based on the theory of geometric optics (N. S. Kapany, Fiber Optics, Principles and Applications, Academic Press, N.Y. 1967) the limit beam angle of full internal reflection towards the axis of the light-guide element section is defined as $$Uc = \arcsin 1 - n_1^2/n_2^2$$

where Uc is a critical angle of full internal reflection;
$n_2$ is the refractive index of an optically transparent material of the light-guide element;
$n_1$ is the refractive index of a medium that is in contact with a light-guide element, for air $n_1 = 1.0$.

Preferably an additional light source, more preferably at least one point light source, is provided for front illumination, are valid for a device having an additional light source for front-end illumination of diffuse-reflective characters. These features are used in case when it is necessary, constantly or on a program, to single out one or several characters by means of light, e.g. logotypes of a trademark.

Along-with the above-mentioned features, light-guide properties of optical materials can ensure illumination from two or more sides. However, this can be accompanied with undesirable optical effects of additive combination of light flows; or else some characters, on a program of illumination, should be imparted with an effect of a dynamically changeable altitude. In order for this problem to be solved, some features should be introduced to ensure light isolation of illuminated zones of diffuse-reflective characters. Therefore is at least one of light-guide element on the side of diffuse-reflective characters furnished with grooves positioned substantially across light beams issuing from the (point) light sources. The grooves are providing a 'shade' after turning-on an appropriate group of light diodes, thus screening the zone of diffuse-reflective characters.

Expansion of the claimed device applications suggests a non-traditional approach to shapes of light-guide elements themselves. So, in an embodiment of the invention at least one light-guide element is made in the form of a polygonal prism. This provides a possibility to create a device in the form of a piece of art doubling for functions of demonstration and illumination. In a specific embodiment of the device the light-guide element is made in the form of a set of trigonal prisms rotatable synchronously around the geometric axis relative to the (point) light sources. This geometry enlarges the volume of information-of the device at least three-fold by placing the information onto three surfaces composed of two or more rotatable prisms. The said distinguishing features make it possible to create such lighting devices as 'prismatrons'.

A side of the light-guide, opposite to a side of the light-guide element being provided with the gravure, is provided with a polished mirror reflective surface. For example, diffuse reflections appear on ground portions of the said surfaces. For such a diffuse reflection to be implemented in the claimed device, the characters are preferably furnished with ground surfaces and the opposite side of a light-guide element is furnished with a mirror reflective covering. The combination of features defined by the presence of the ground characters and the mirror reflective covering serves to achieve uniformity of exposure of ground portions of the light-guide element. To achieve a uniform illumination of color slides with white light, one of the surface of one light guide elements is made fully ground. The light-guide element is in a preferred embodiment furnished with a transparent film on the surface which is opposite to the ground surface, such that the transparent film is arranged between at least two light-guide elements. This light-guide element can also be furnished with an additional group of light diodes which radiate additive white light, for example LEDs of HLMP-CW 15 or HLMP-CW 30 types from "Hewlett Packard" Corp.

In an embodiment of the invention the device has light-guide elements of laminated shape mounted a gap apart and opposite each other. The device is provided with an additional removable light-guide elements made of an optically transparent material in the form of parallelepipeds with polished sides where there are provided diffuse-reflective characters. The above parallelepipeds are mounted in the said gap so that they are in optical contact to light-guide plates. The combination of the above-mentioned distinguishing features is sufficient for embodiment of new designs of advertising-information screens displaying rapidly changeable information. To do so, it is sufficient to have an appropriate set of removable elements furnished with engraved characters. Considering that each optically transparent parallelepiped has four planes for appropriate information to be placed on them, the above-mentioned features enlarge informative capacity of the device by a factor of 2 or 4.

In the center of at least one light-guide elements are made holes having cylindrical polished internal surfaces which are optically coupled with an additional set of light diodes.

In a last embodiment the electronic programmed unit illuminates the point light sources sequentially. By such control data can be displayed in a dynamic and/or more dimensional way.

BRIEF DESCRIPTION OF THE DRAWINGS

For further details of the invention, reference may be made to the accompanying non-limitative drawings wherein:

FIGS. 10–12—cross-sections of a light-guide plate with light diodes;

DETAILED DESCRIPTION OF THE INVENTION

Figure 1:
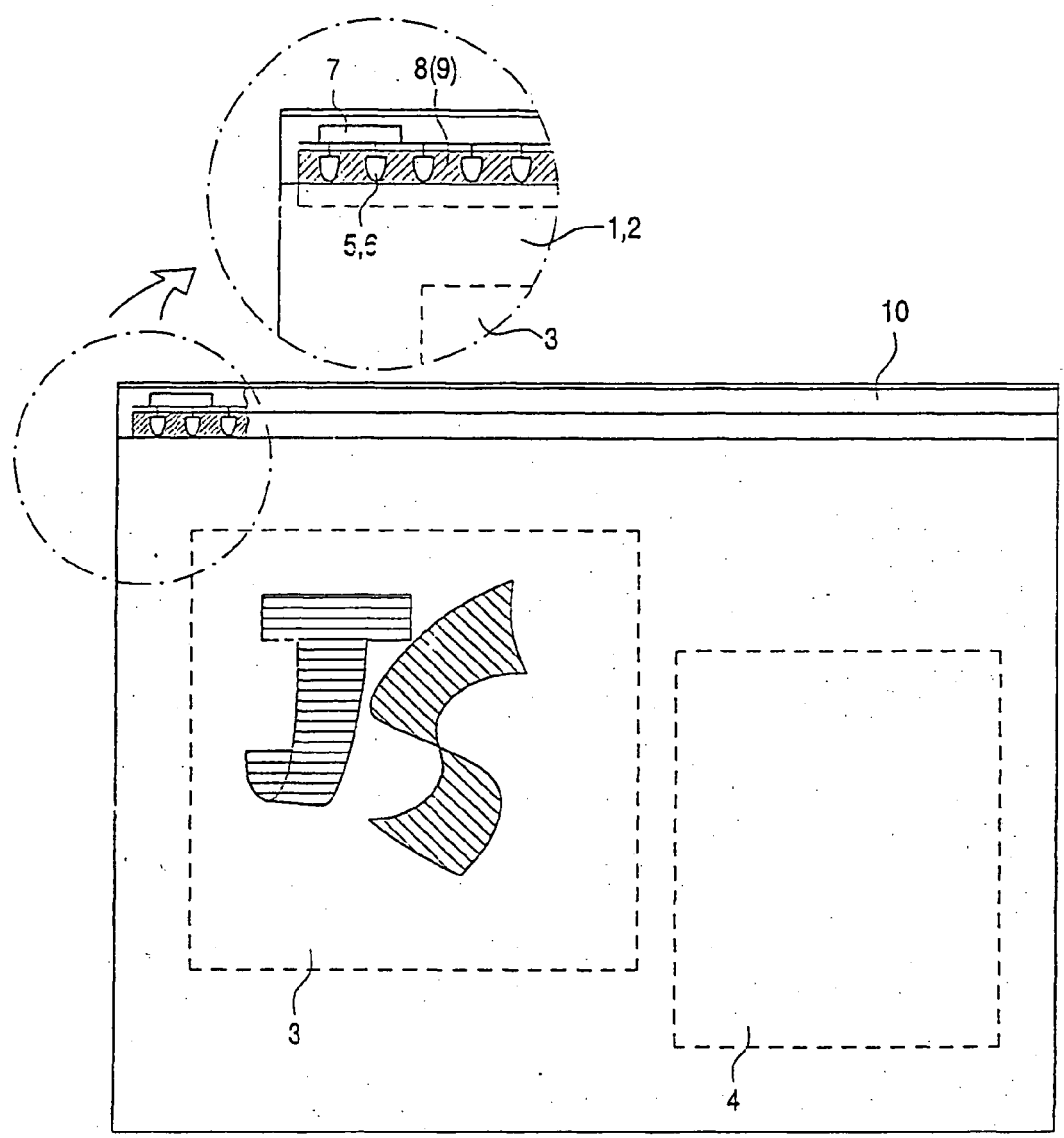
FIGS. 1–9—embodiments of the claimed device.
Figure 2:
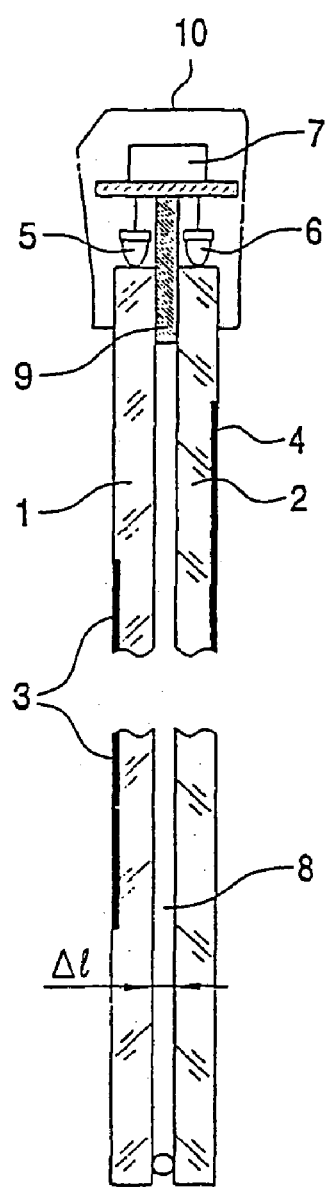
Figure 3:
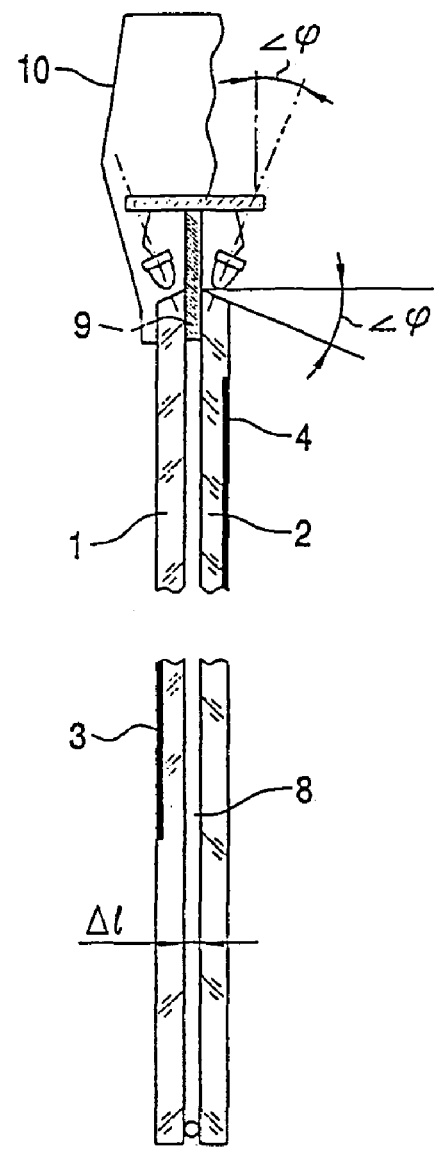

FIG. 1 is a design of the data display device comprising at least two light-guide elements 1, 2 having polished surfaces. For an optical material, acrylic "organic" glass may be used. Engraved on the wide surface of the light-guide element 1, on one or two sides, there are provided engraved diffuse-reflective characters (signs, litters, pictures) 3 to form in the aggregate an information unit, e.g. a logotype of a trade-mark. The wide polished surface of the light-guide element 2 is also furnished with diffuse-reflective characters located in the zone 4. Structurally, the device in FIGS. 1 and 2 is provided with light-guide plates 1 and 2 of a rectangular shape, with point radiators being mounted on their narrow polished sides to illuminate the characters 3 while the zone 4 being furnished with characters on the plates 1 and 2, respectively. As is seen in FIGS. 1 and 2, the point radiators are provided with electric power-supply units to choose modes of 'on-off' action of the above radiators under electronic programs. For the point light sources, the device may use solid-state semiconductor diodes arranged in groups 5 and 6. Electronic programmed unit 7 controls the action of the groups of light diodes 5 and 6, respectively. An optically isolating plate 9 is mounted between the groups of light diodes 5 and 6. In the gap 8 (L>0.6 micrometer) between the light-guide elements 1 and 2 there is air having the refraction index $n_1=1$. The elements 5, 6, 7, 8 are housed inside protective casings 10. In manufacturing the data display device a problem arises at times as to redistribution of light flowing from light diodes 5 and 6 to enhance mirror-reflective constituents. In this situation the light-guide elements 1 and 2 that are in optical contact with the light diodes 5 and 6 can be provided a tilt at an angle $\phi$, as shown in FIG. 3.

Figure 4:
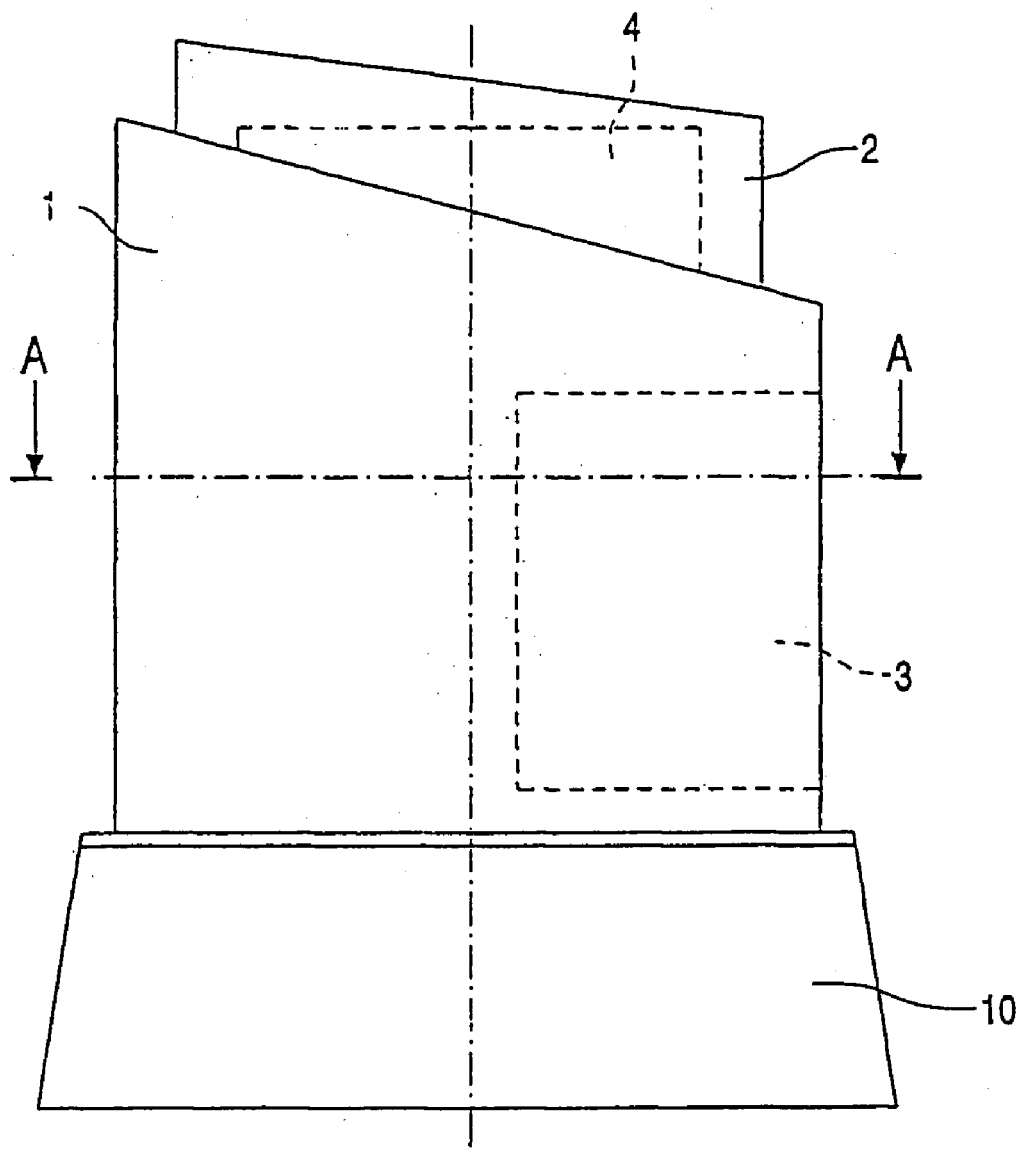
Figure 5:
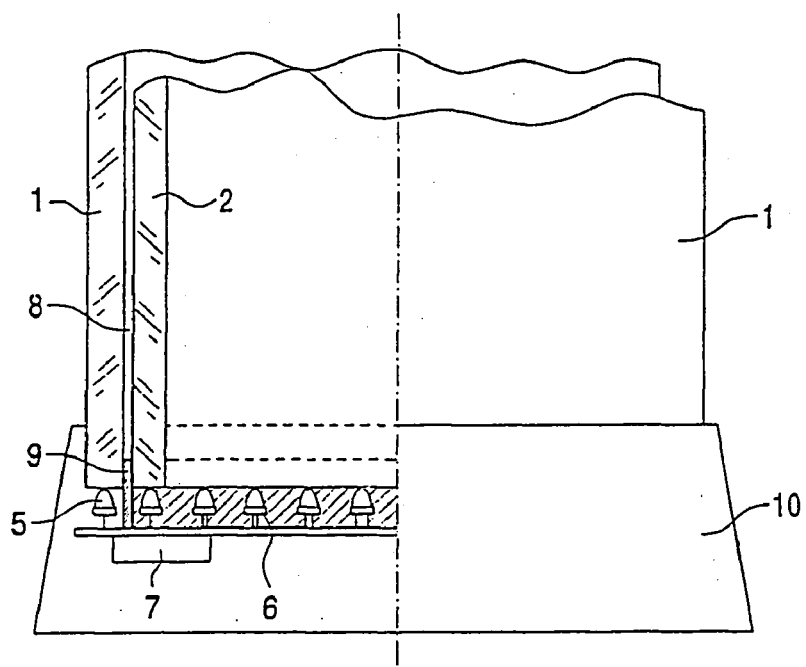
Figure 6:
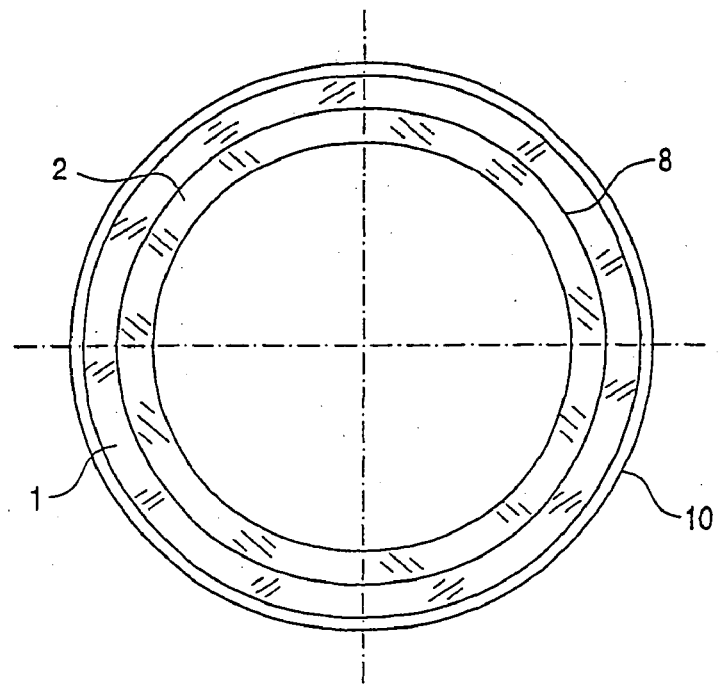

Light-guide properties of optically transparent materials enable one to make the light-guide elements 1 and 2 curvilinear, as is shown in FIGS. 4 and 5. For this design of the device, the above-mentioned elements 1 and 2 are made in the form of two coaxial cylinders that are inserted into each other and housed in the casing 10. The characters 3 and 4 are made on cylindrical surfaces of the light-guide elements 1 and 2. The bases of the cylinders of the elements 1 and 2 are illuminated by means of the light diodes 5 and 6 by means of the electronic programmed units 7, as is shown in FIG. 6. Between the two light-guides elements 1 and 2 are the air gap 9 ($\Delta L >> 0.6$ micrometer).

Figure 7:
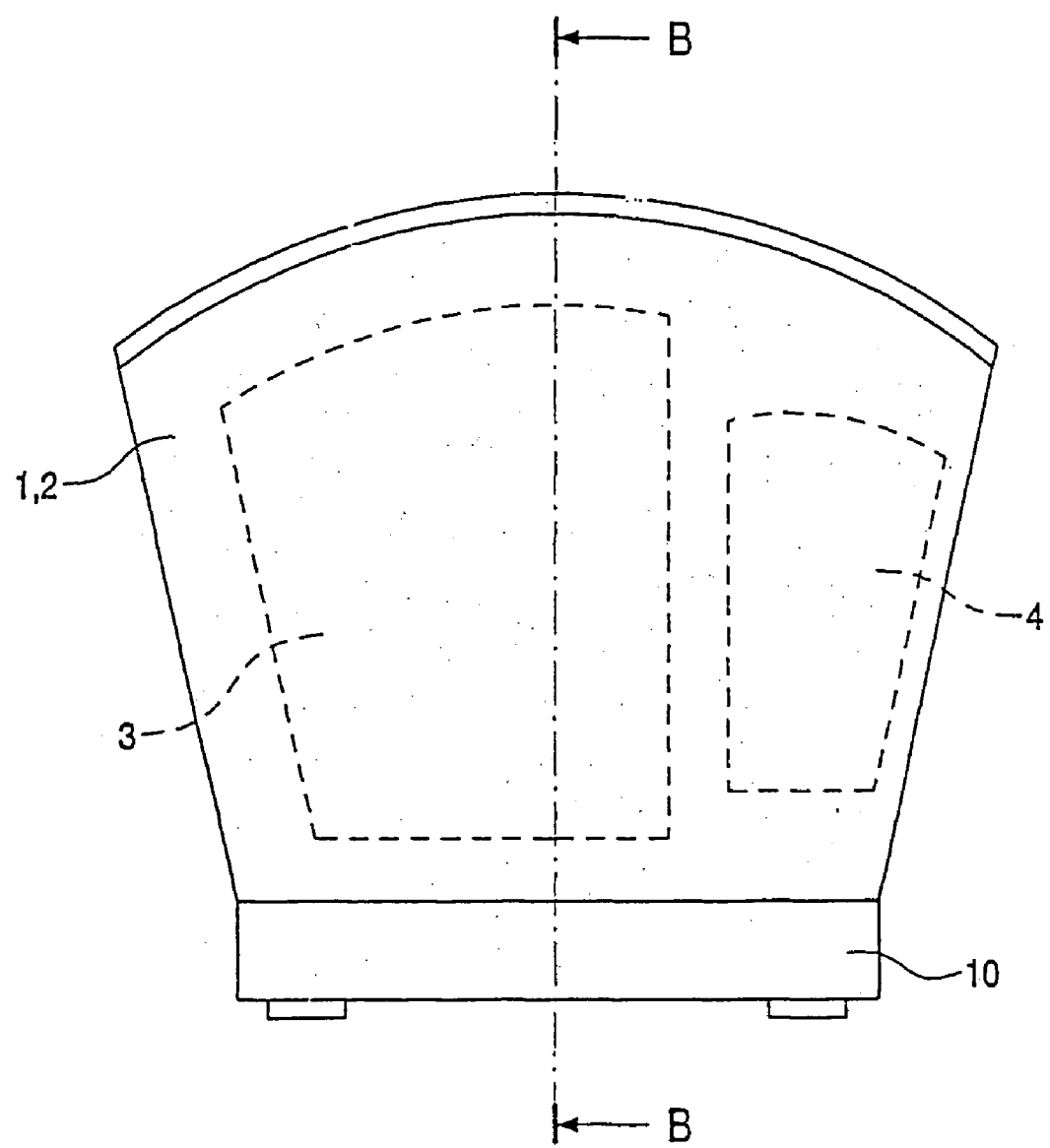
Figure 8:
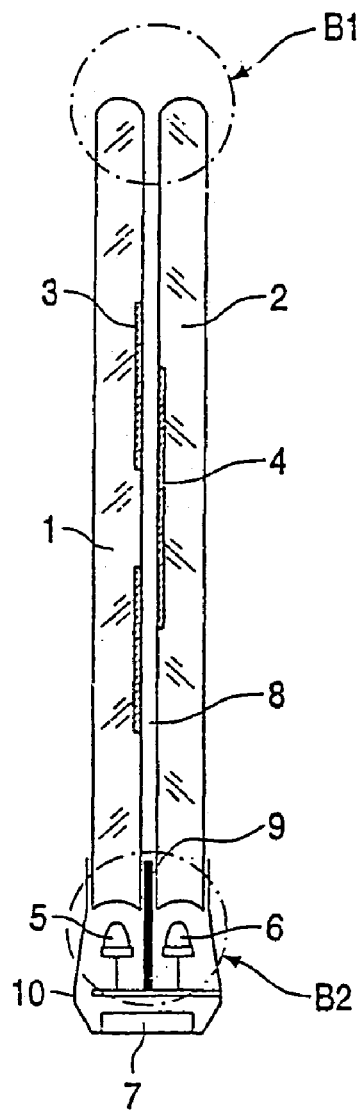
Figure 9:
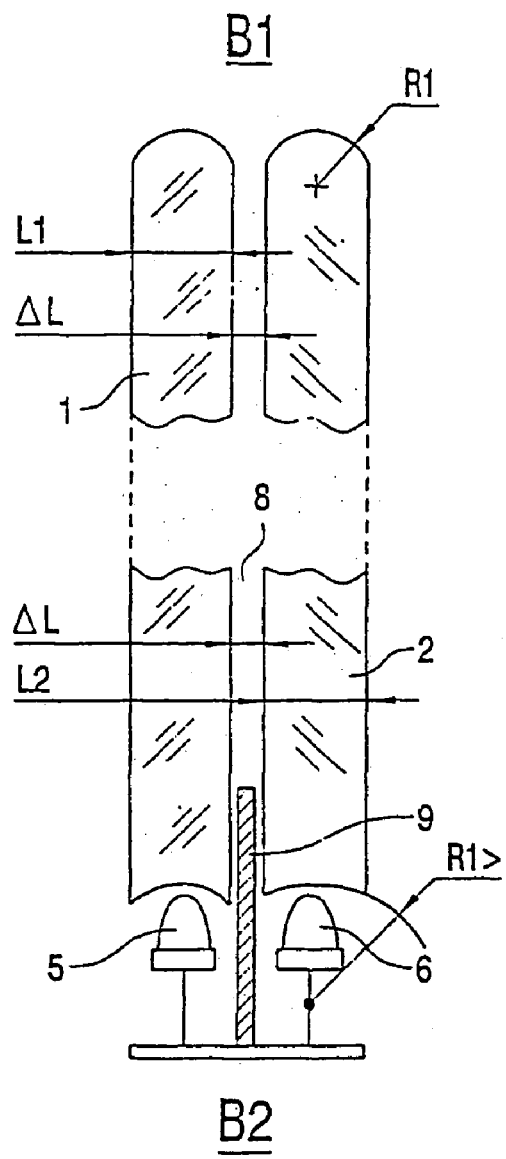

FIGS. 7 to 9 show an embodiment of the data display device with light-guide elements 1 and 2 in the form of plates having in their front-end surface a shape different from a rectangular shape (FIG. 7). In the above design a general problem associated with redistribution of light flow from the light diodes 5 and 6 is solved by forming a curvilinear outline of the narrow surface of the elements 1 and 2 (FIGS. 8 to 9), with the curvature radius R being less than the thickness of the said elements.

In that event the curvilinear surface fulfils the role of a cylindrical diffusing lens to enlarge the angle U of the directivity diagram of the light diodes 5, 6 and to enhance the mirror-reflective constituent in their radiation. It especially becomes a live issue when using highly intensive light diodes having the directivity diagram with the angle U up to 20°–45°.

Let us consider cross-sections of the light-guide plates 1 shown in FIGS. 10 to 12. Light rays 11 from the light diode 5 undergo a number of mirror reflections from the polished surface of the plate 1. This takes place in view of the presence of a gradient in the refraction factor at the interface of the two optical media having different refraction factors $n_1 > n_2$. In case there are no deformations on polished surfaces of the plate 1, the light ray 11, after multiple mirror reflections, will go out through the opposite face. If the surface of the plate is furnished with an engraved character 3 the principle of mirror reflection of the ray 11 is violated at this place with the ray 12 being diffusely reflected from engraved portions of the character 3. In FIGS. 10 to 12 these rays 12 are shown with thick arrows. Portions of the polished surface may be also referred to as belonging to diffuse-reflective deformations of polished surfaces of the element 1.

Figure 13:
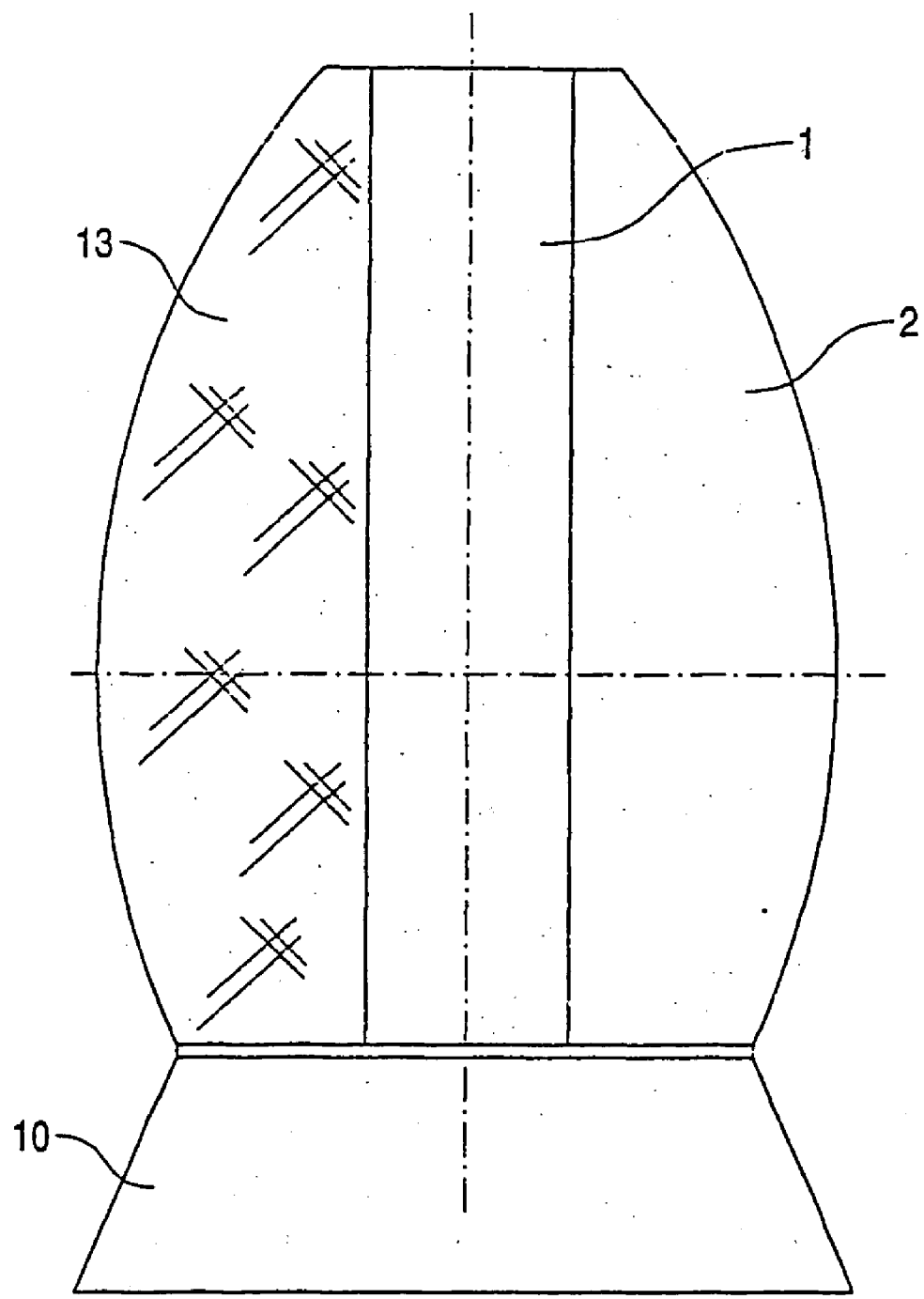
FIGS. 13–20—a design of the claimed device with three light-guide elements.
Figure 14:
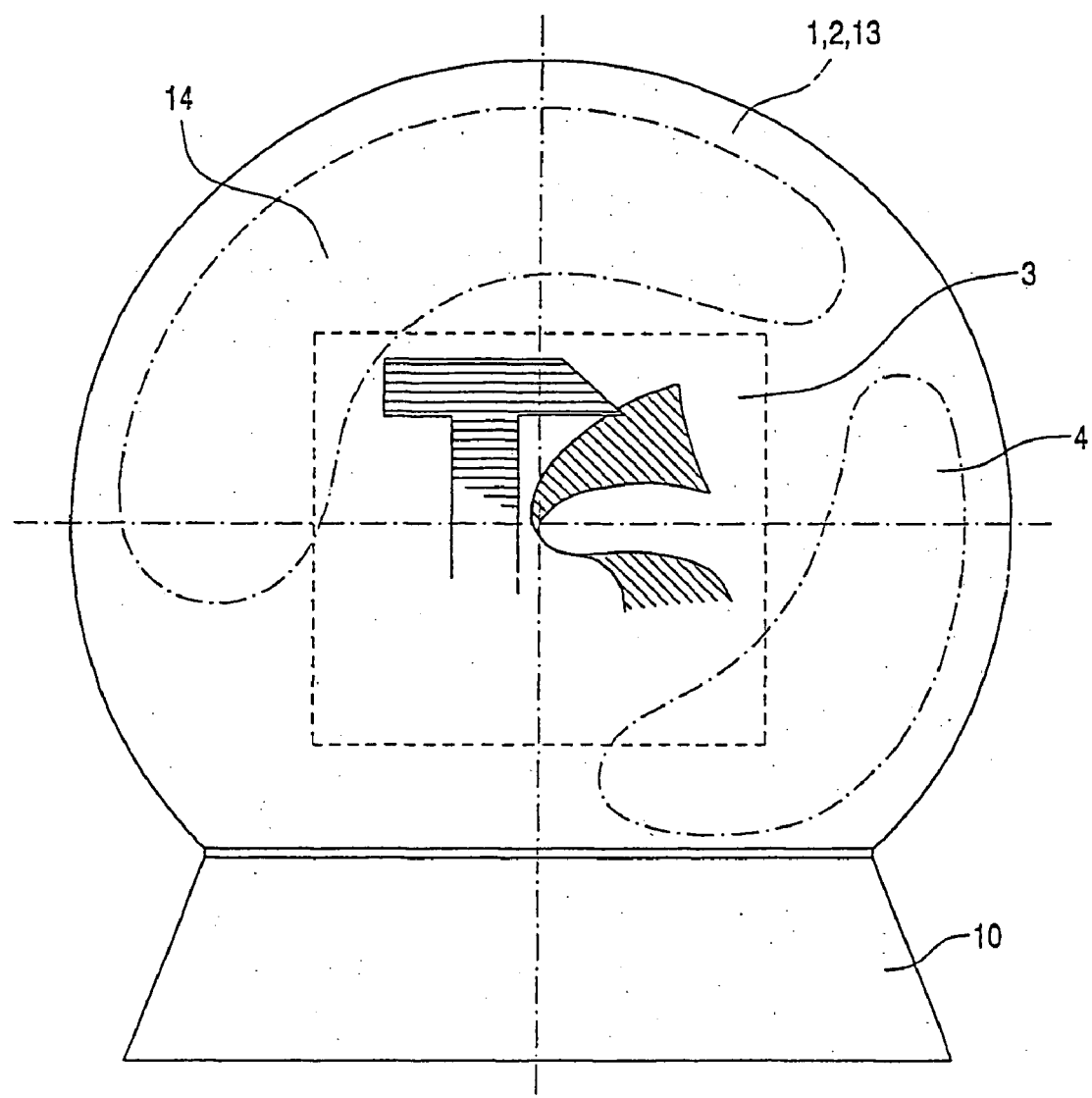
Figure 15:
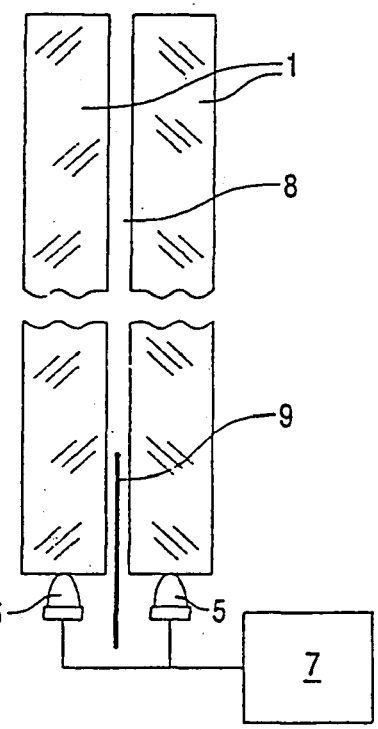
Figure 16:
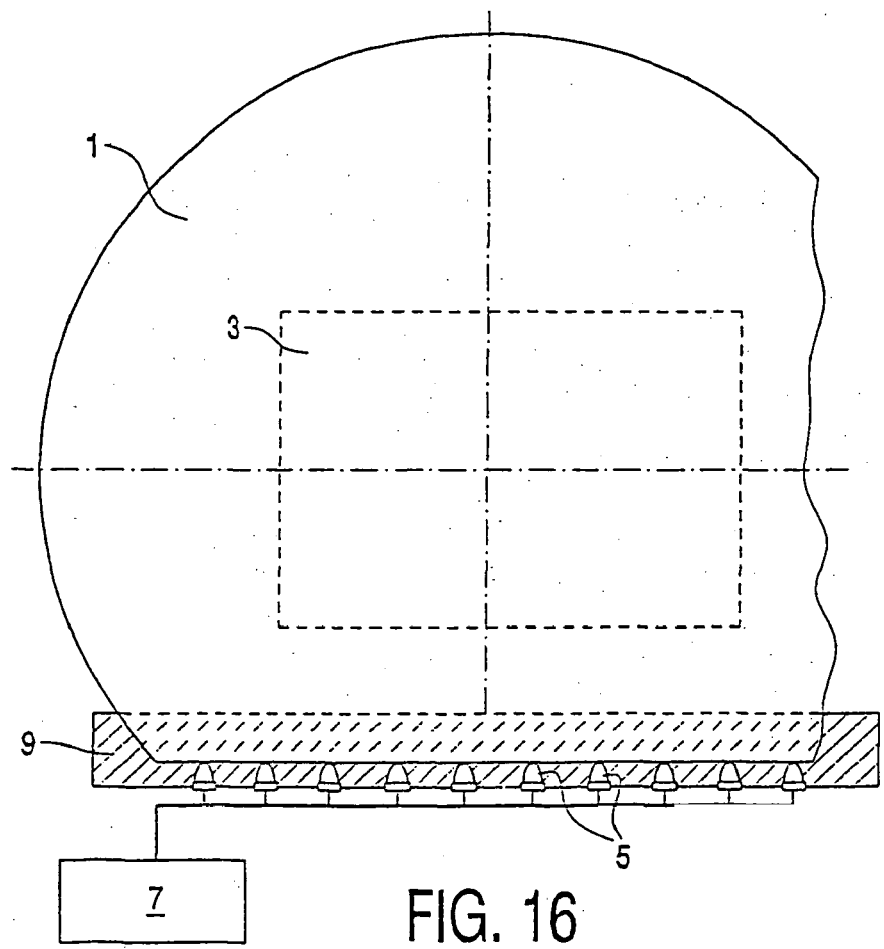
Figures 17, 18:
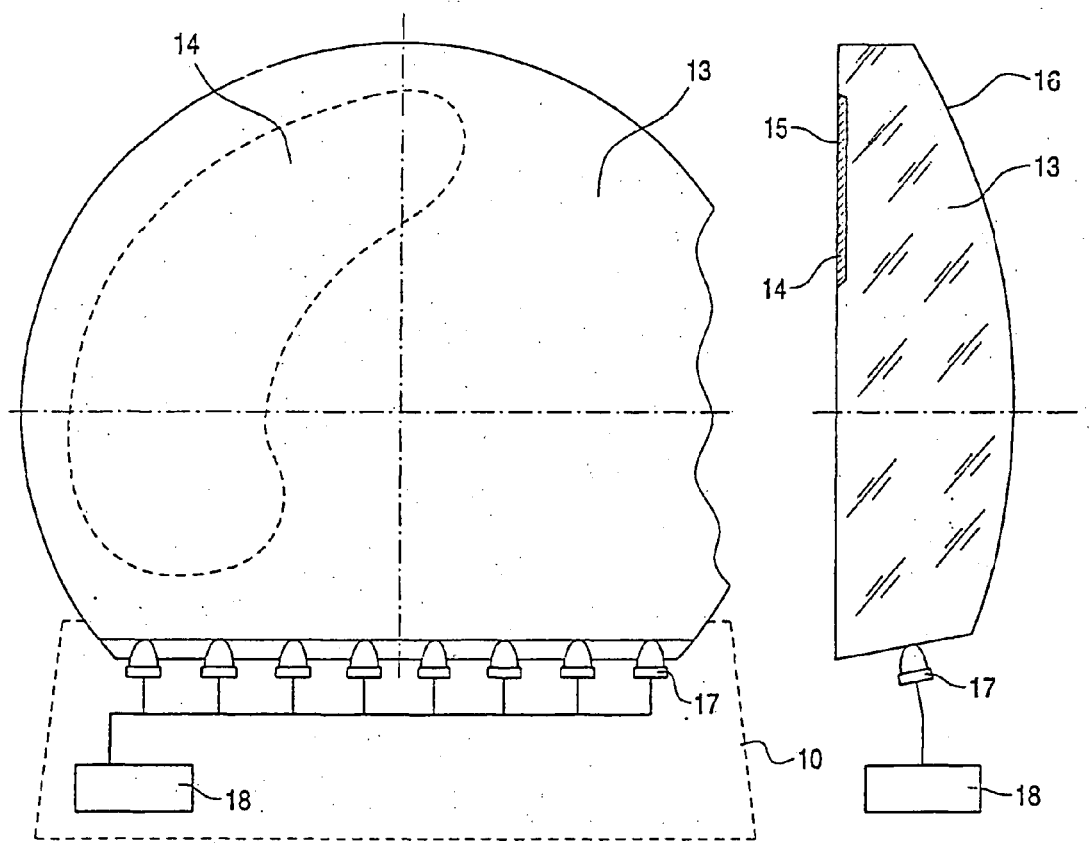
Figure 19:
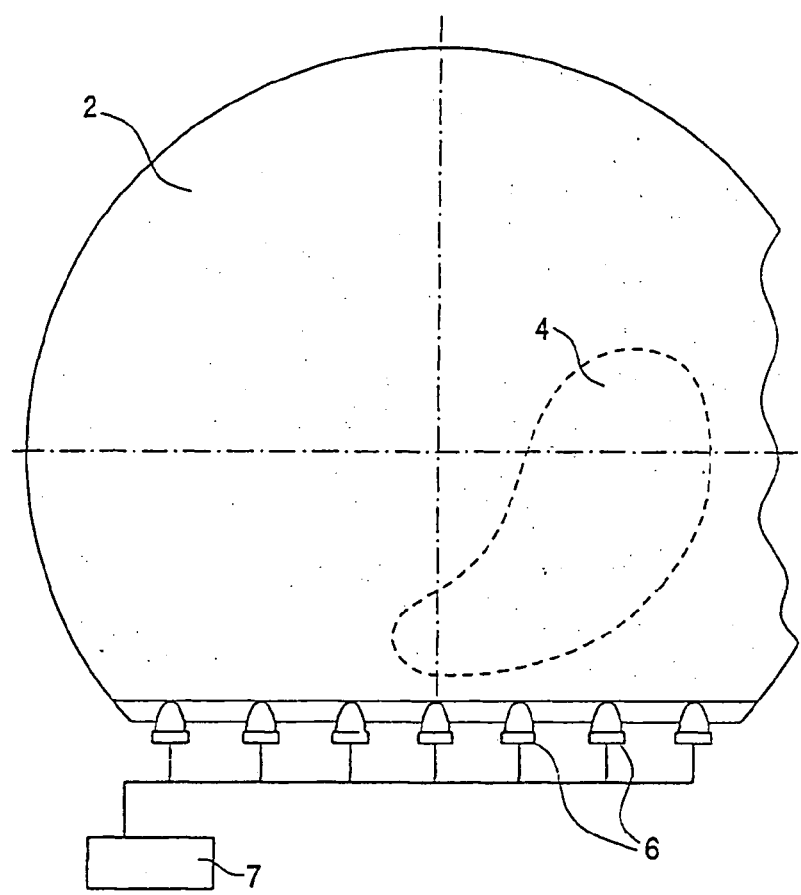
Figure 20:
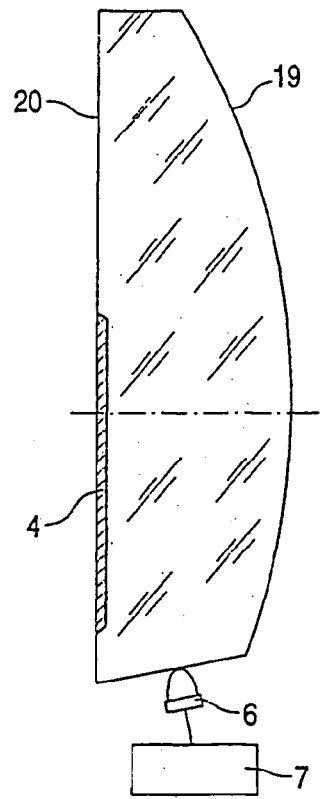

FIG. 13 shows a structural embodiment of the data display device comprising three light-guide elements 1, 2 and 13, two of which are made in the form of optical lens having flat-convex surfaces (the elements 2 and 13), while the element 1 has flat surfaces mated to surfaces of the elements 2 and 13. As is evident from FIG. 14, diffuse-reflective characters 3, 4 and 14 are made on surfaces of all the light-conducing elements 1, 2 and 13 to form in the aggregate a united informative composition. The light-guide element 1 with the characters 3 shown in FIGS. 15 and 16 may be made in the form of two plates (for example 1 and 1*) having an air gap 9 between them. The element 1 (1*) have a flat surface mated to two rows of the light diodes 5 that are electrically connected to the programmed control unit 7. With reference to FIGS. 17 and 18, the additional light-guide "lens" 13 having a character-containing zone 14 placed on a flat surface 15 is furnished with a frosting convex surface 16 and a flat surface (at an angle φ) mated to a set of light diodes 17. Light diodes 17 are operated from an additional power-supply unit 18. The light-guide element 2 (FIGS. 19 to 20) has a convex surface 19 and a flat surface 20 skewed at an angle φ and mated to a set of the light diodes 6. The light diodes are energized from the unit 7 on an electronic program to control their on-off action. As an assembly, the data display device (FIGS. 13–14) has two functions—demonstration of information and decorative illumination.

Figure 21:
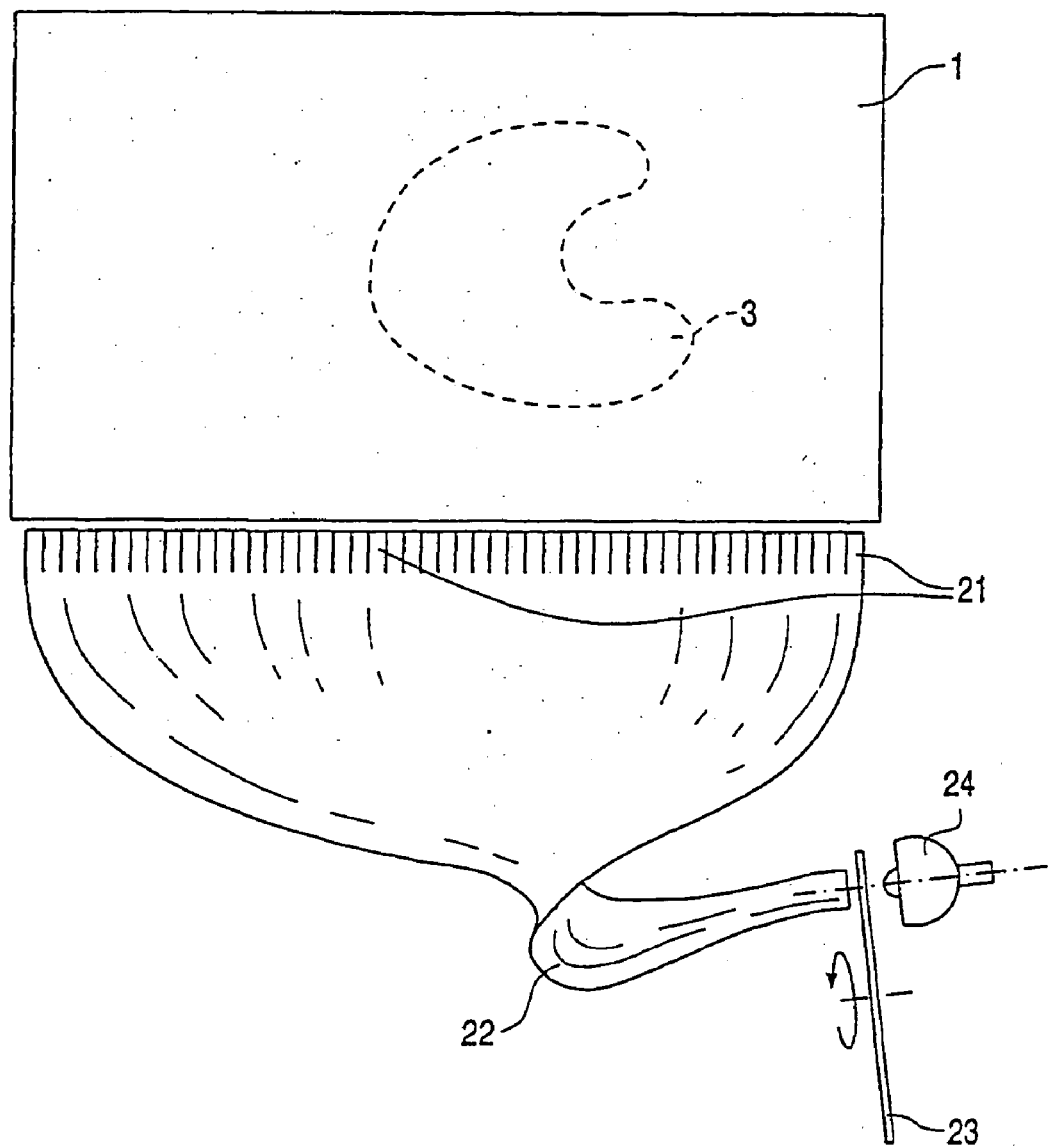
FIGS. 21–23—a design of the claimed device with fiberglass light conductors.
Figure 22:
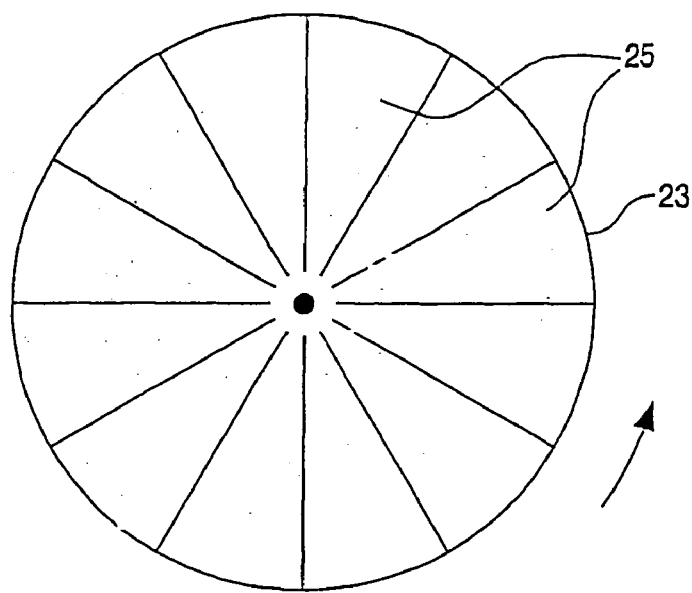
Figure 23:
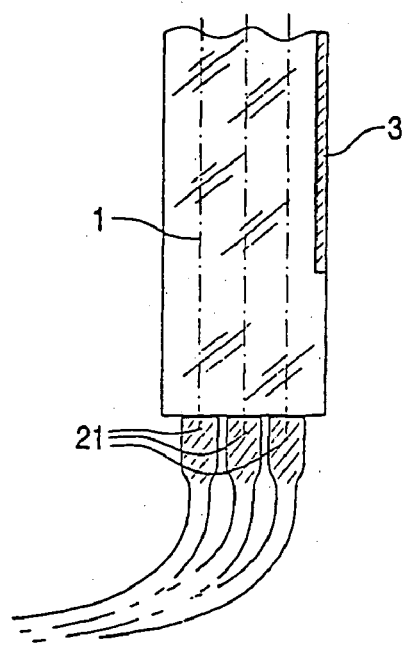

For light sources to illuminate the light-guide elements, use may be made in the device also of other point light sources. So, the device shown in FIGS. 21 to 23 incorporates a set of light-guide elements 21 made of light conductors, e.g. glass-fiber or plastic-fiber. On one side, the edges of the light-guide elements 21 are mated to the surface of the light-guide plate 1 containing diffuse-reflective characters 3 where as the opposite edges are collected in a cable 22 with its edge being mounted in the immediate vicinity of a rotating color-programmed disc 23 lighted with an independent illuminator 24. The color-programmed disc 23 is made of a set of light filters 25 (FIG. 22). Advantages of this illumination are its high specific power of lighting and the small size to allow for arranging output edges 21 in three rows (FIG. 23).

Figure 24:
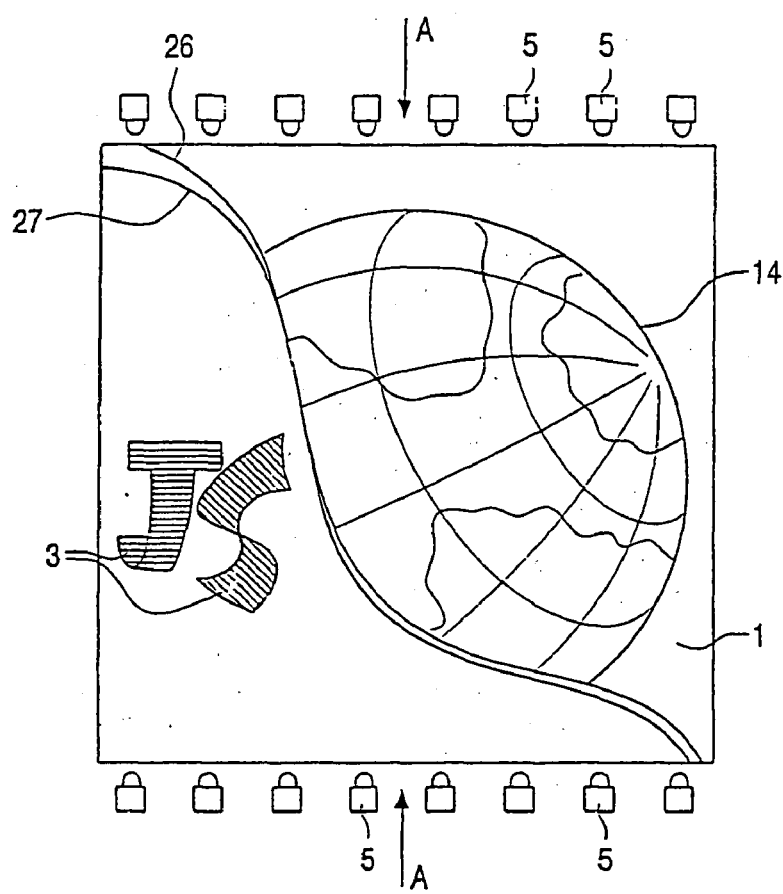
FIGS. 24–25—an embodiment of a light-guide plate with light isolation (shielding)
Figure 25:
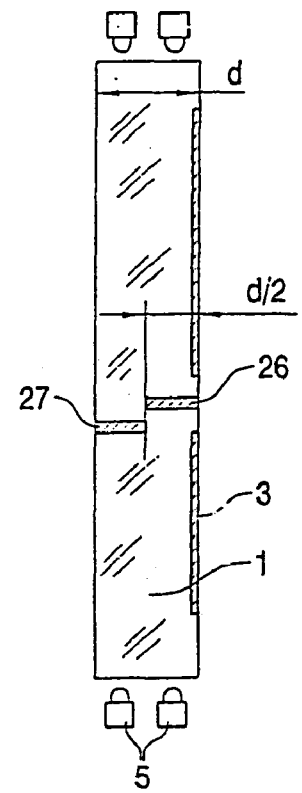

Light-guide properties of the light-guide elements 1, 2 and 13 carry considerable potentialities for designing a great diversity of various devices. For instance, when illuminating the diffuse-reflective characters on one or more sides a demand arises for ensuring light isolation of different portions of information: In tackling this problem a possibility appears to have separate illumination of-at least two informative zones. FIGS. 24 and 25 show a design of the light-guide element 1 with diffuse-reflective characters located on one of flat surfaces. Two rows of light diodes 5 are placed at the top and at the bottom to illuminate the left and the right informative zones according to the embodiment as shown in FIG. 24.

Figure 26:
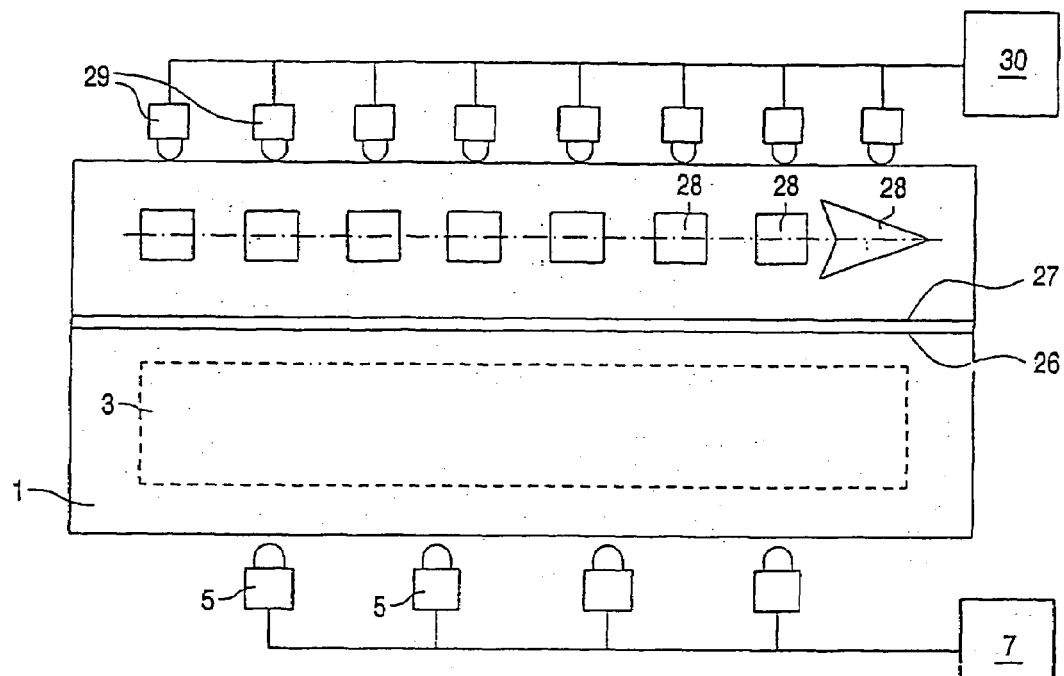
FIGS. 26–27—an embodiment of the light-guide element with diffuse-reflective characters dynamically lighted—"the effect of motion"
Figure 27:
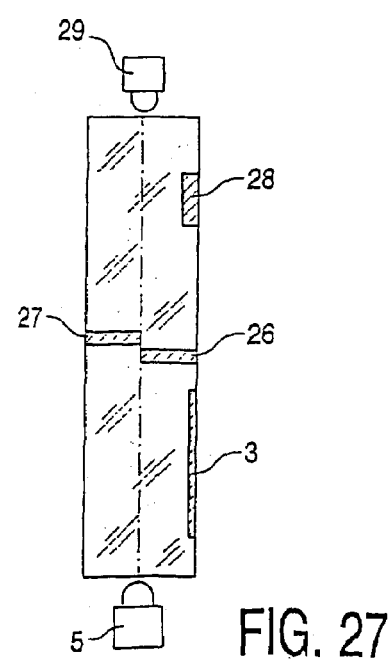

For the above informative zones to be isolated, there are provided two engraved grooves 26–27 and 27–26 as deep as no more than one-half the thickness of the plate 1. The above grooves 26 and 27 separate the informative "globe" zone from the "trade character" zone to ensure separate illumination of these zones. FIGS. 26 and 27 show a structural embodiment of the data display device with dynamic illumination. This device has a rectangular plate 1 containing two informative zones with characters 28—a static zone with characters 3 and a dynamic zone—separated with light-isolating grooves 26 and 27. There is provided a set of light diodes 29 and a unit 30 to effect programmed electronic control over on-off action of the light diodes. When the light diodes are energized in succession the characters 28 will be illuminated in succession too to produce the effect of motion.

Figure 28:
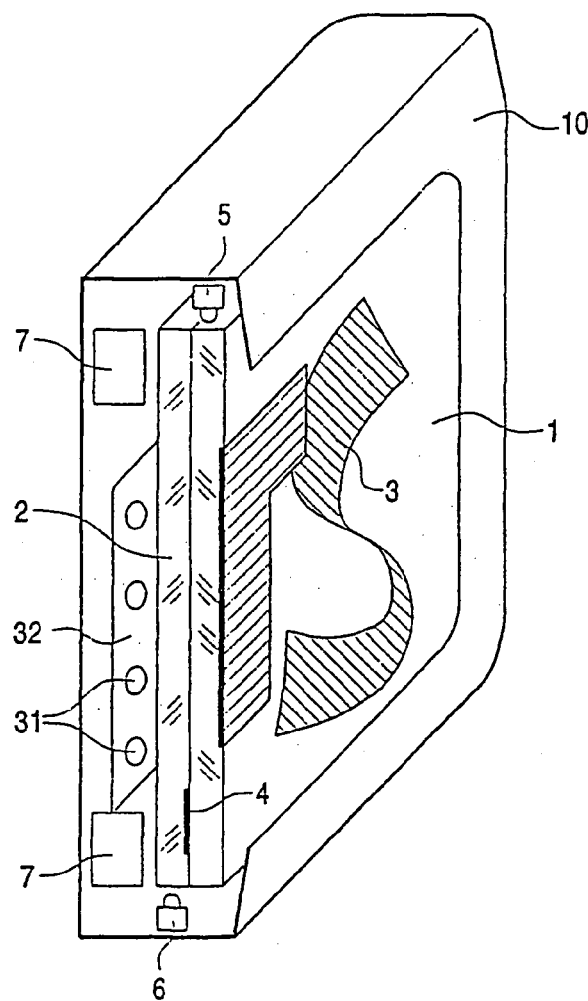
FIGS. 28–29—a design of the data display device with additional front-end illumination of diffuse-reflective characters.
Figure 29:
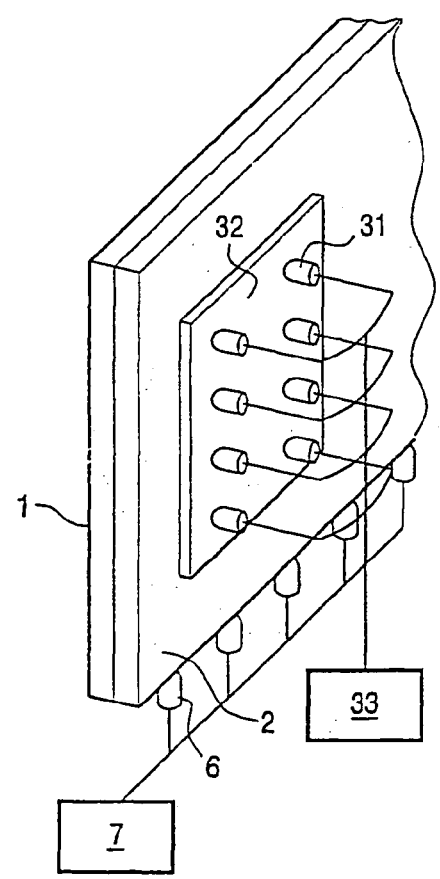

The device allows also for the use of additional sources of illumination which can directly illuminate any character or symbol in a front-end manner. So, FIGS. 28 and 29 show such a device that is provided with a matrix of light diodes 31 mounted on a board 32 that is in a front-end position relative to the trade character 3. An electronic programmed power-supply unit 33 provides the light diodes 31 with varied modes of front-end illumination.

Figure 30:
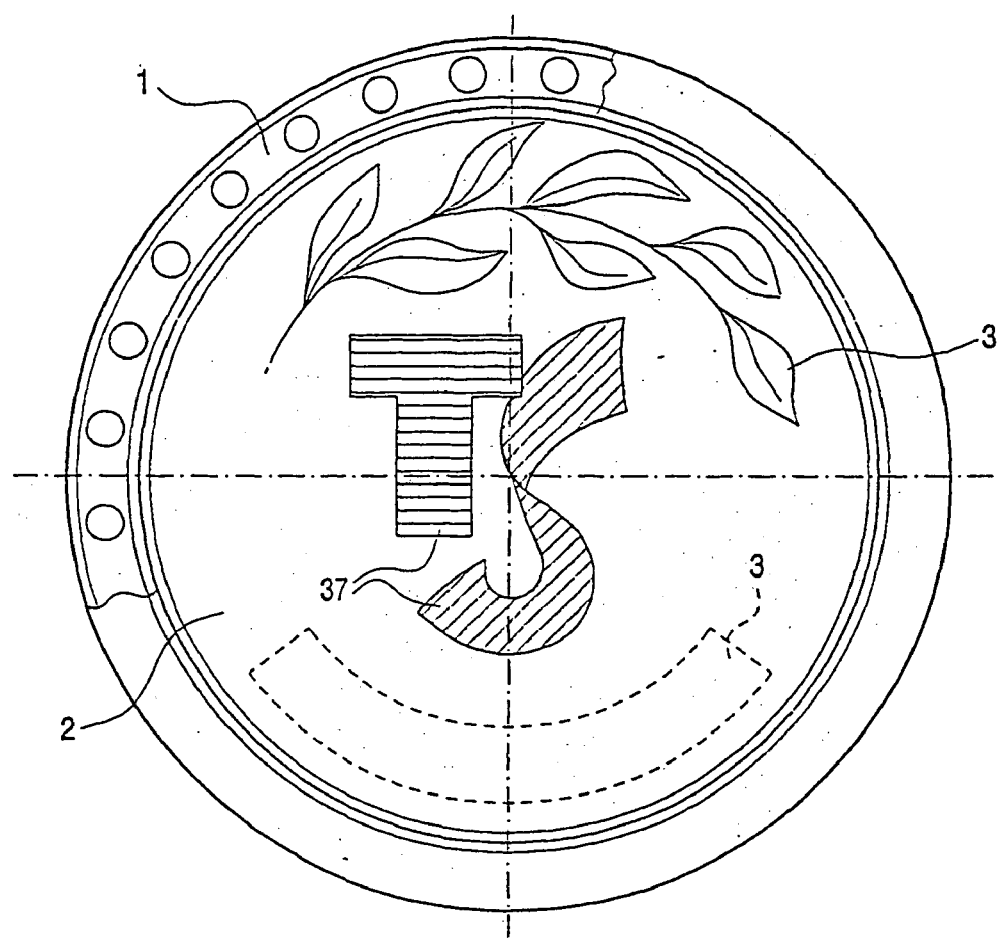
FIGS. 30–35—embodiments of the data display device with ground and combined diffuse-reflective characters.
Figure 31:
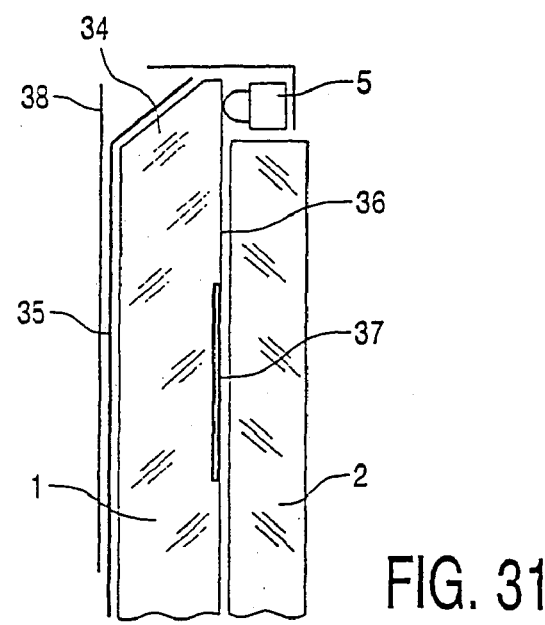

Of interest may be a design of the device shown in FIGS. 30 and 31. It comprises light-guide plates 1 and 2 in the form of discs, with the disc 1 having a facet 34 to form a reflecting surface for radiation issued from light diodes 5. Applied to the facet 34 and to the rear surface of the disc 1 is a mirror covering 35. The other surface of the disc 1 is furnished with characters 37 made, by means of polishing a portion of a surface 36, in the form of anti-reflective polished symbols, e.g. a trade mark. The disc 2, in reference to the disc 1, fulfils the high-priority protective role, but in some cases this disc may be also provided with independent illumination. The two discs 1 and 2 together with the set of light diodes 5 are housed in a protective casing 38. Such a device may find its application as a glass decorative table board.

Figures 32, 33:
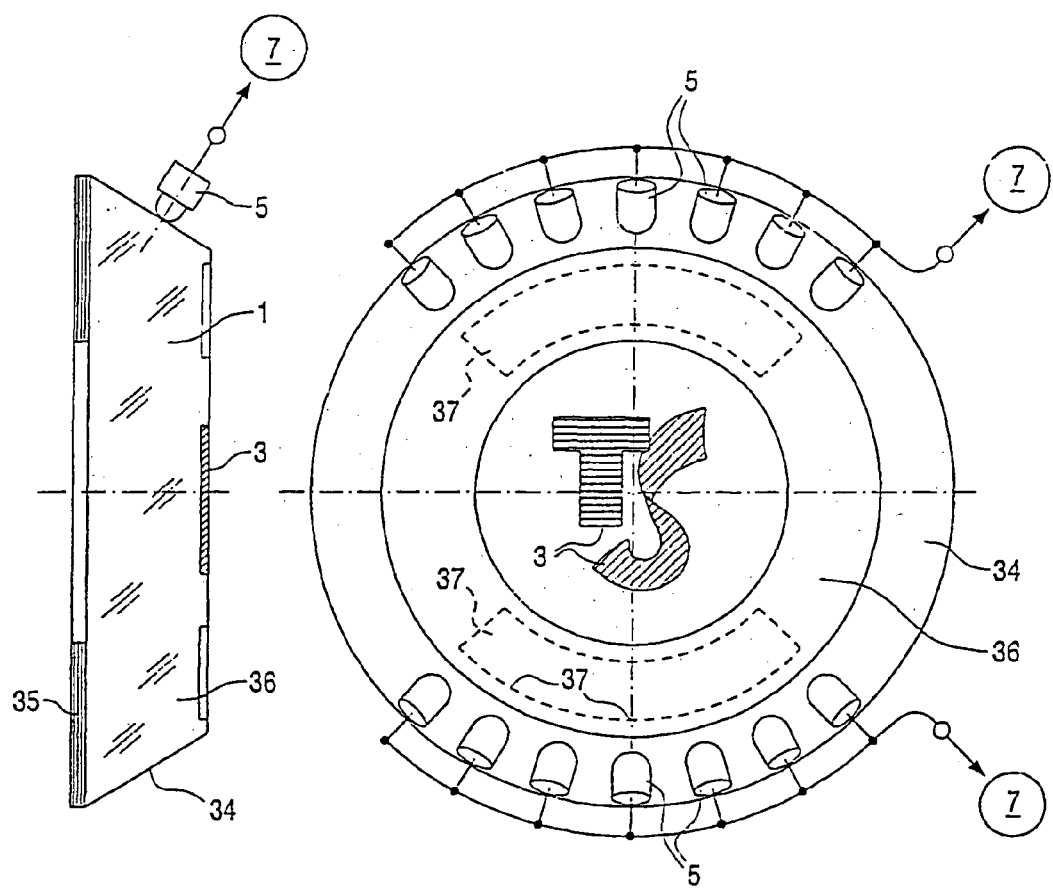
Figure 34:
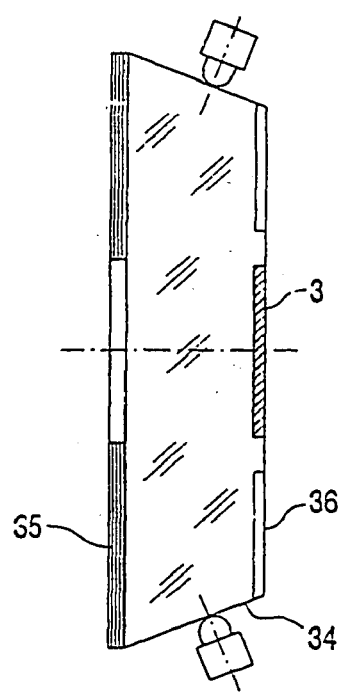
Figure 35:
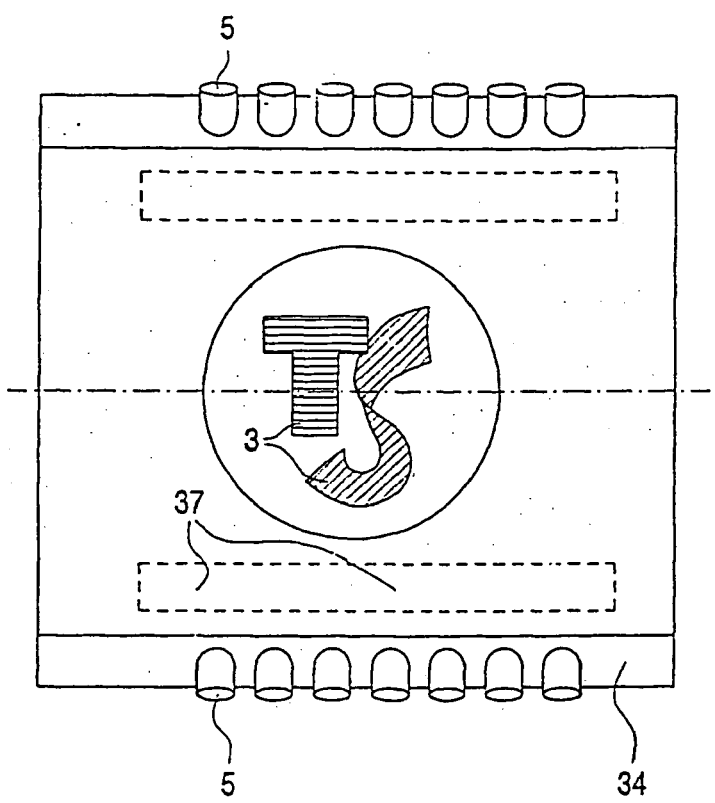

The principle of light conductivity combined with diffuse reflection may be valid to design flat luminaries that are meant for advertising information. FIGS. 33 to 35 show two designs of such devices, one of which being made in the form of a disc (FIGS. 32–33) and the other in the form of a rectangle (FIGS. 34–35) with combination of diffuse reflecting zones and characters 3 (made by engraving) and 37 (made by polishing). The characters 3 are made on a portion of the polished surface of the light-polishing element 1 surrounded by a polished surface 36 containing a zone 37 of 'anti-reflective polished characters'.

Due to a mirror reflecting layer 38–37 the frosting surface 36 is set off in the form of a lighting background to form appropriate characters in the zone 37 at borders of the polished portions. The light diodes 5 mounted on a skew facet 34 illuminate the mirror covering 35 and a frosting background 36 as well as diffuse-reflective characters 3. The light diodes 5 are switched by the electronic programmed unit 7.

Figure 36:
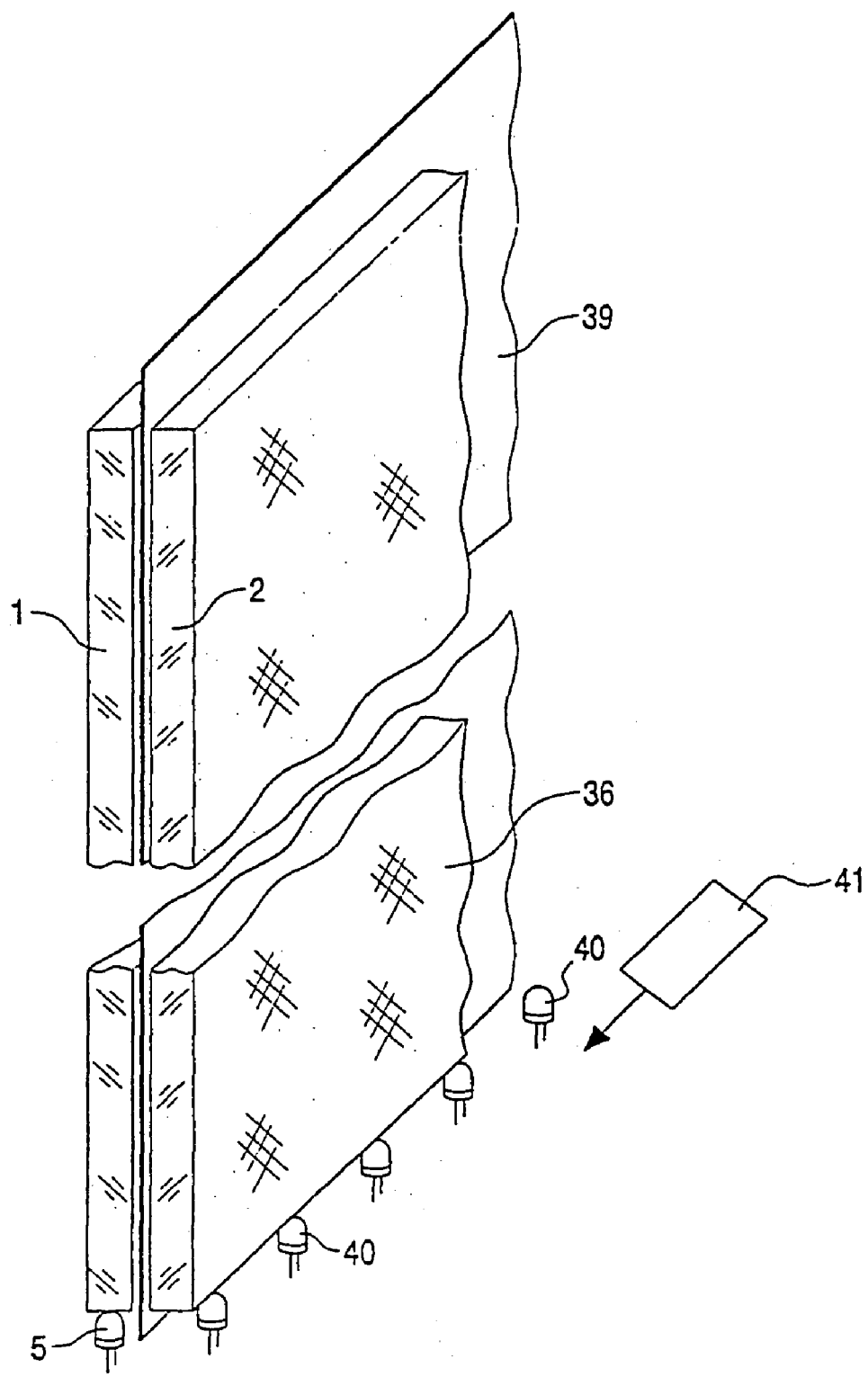
FIG. 36—an embodiment of the data display device to illuminate slides.

The data display device shown in FIG. 36 is made in the form of two light-guide plates 1,2 united in a single assembly. The diffuse-reflecting characters 3 are applied to the surface of the element 1. Fixed in the gap between the elements 1 and 2 is a transparent film 39. The surface 36 of the plate 2 is made filly ground, the other surfaces being polished. For the plate 2 and the film 39 to be illuminated, use is made of light diodes 40 irradiating white light. Intensity of irradiation of the light diodes 40 is regulated by the electronic programmed unit 41.

Figure 37:
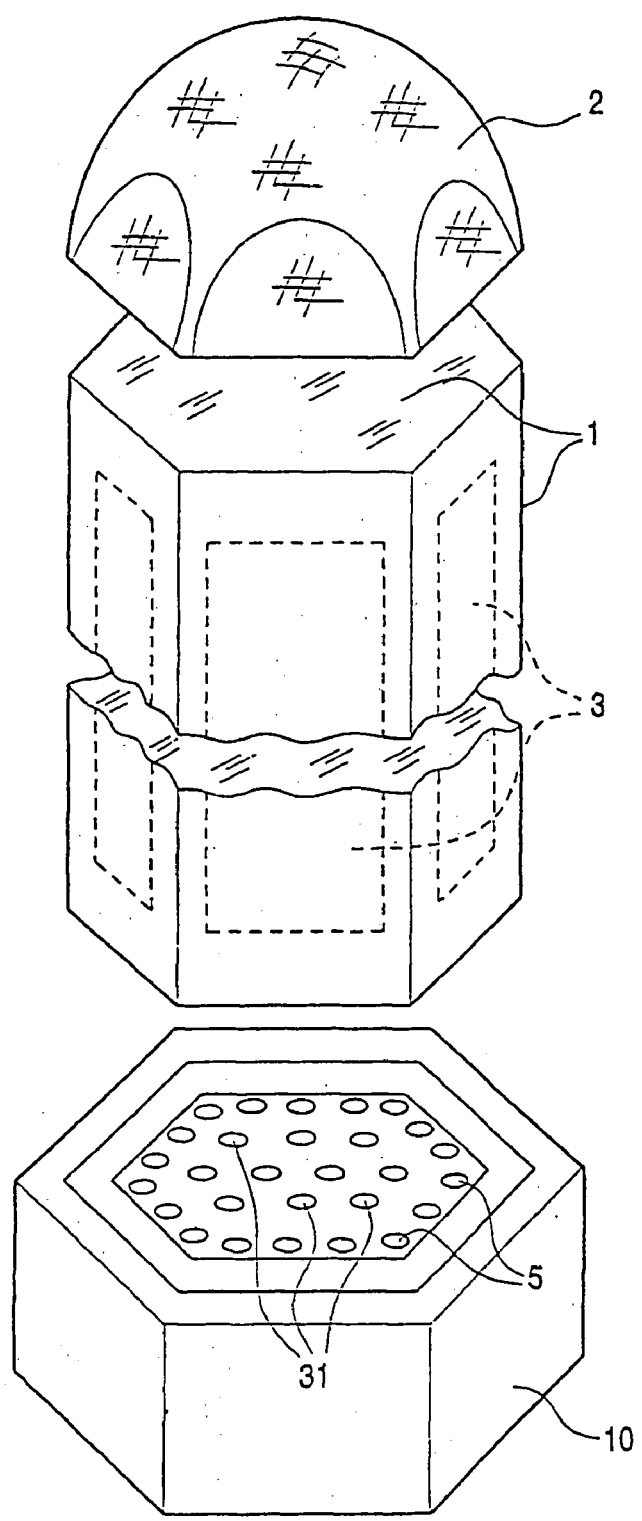
FIG. 37—an embodiment of the light-guide element in the form of a polygonal prism.

The data display device shown in FIG. 37 is made in the form of two light-guide elements 1 and 2, one of which having the shape of a monolithic polygonal prism, e.g. a hexahedron. The element 2 is made in the form of a curvilinear prismatic element with the frosting surface 36. Mating surfaces of the elements 1 and 2 are polished. One or two of these surfaces may contain characters 3 which, when illuminated by light diodes 31 in a front-end manner, are projected onto the frosting surface 36. The rest of the characters placed in the zones 3 are made by engraving and, when illuminated by a set of the light diodes 5, are reflected in a diffuse manner. All the elements are housed in the casing 10.

Figure 38:
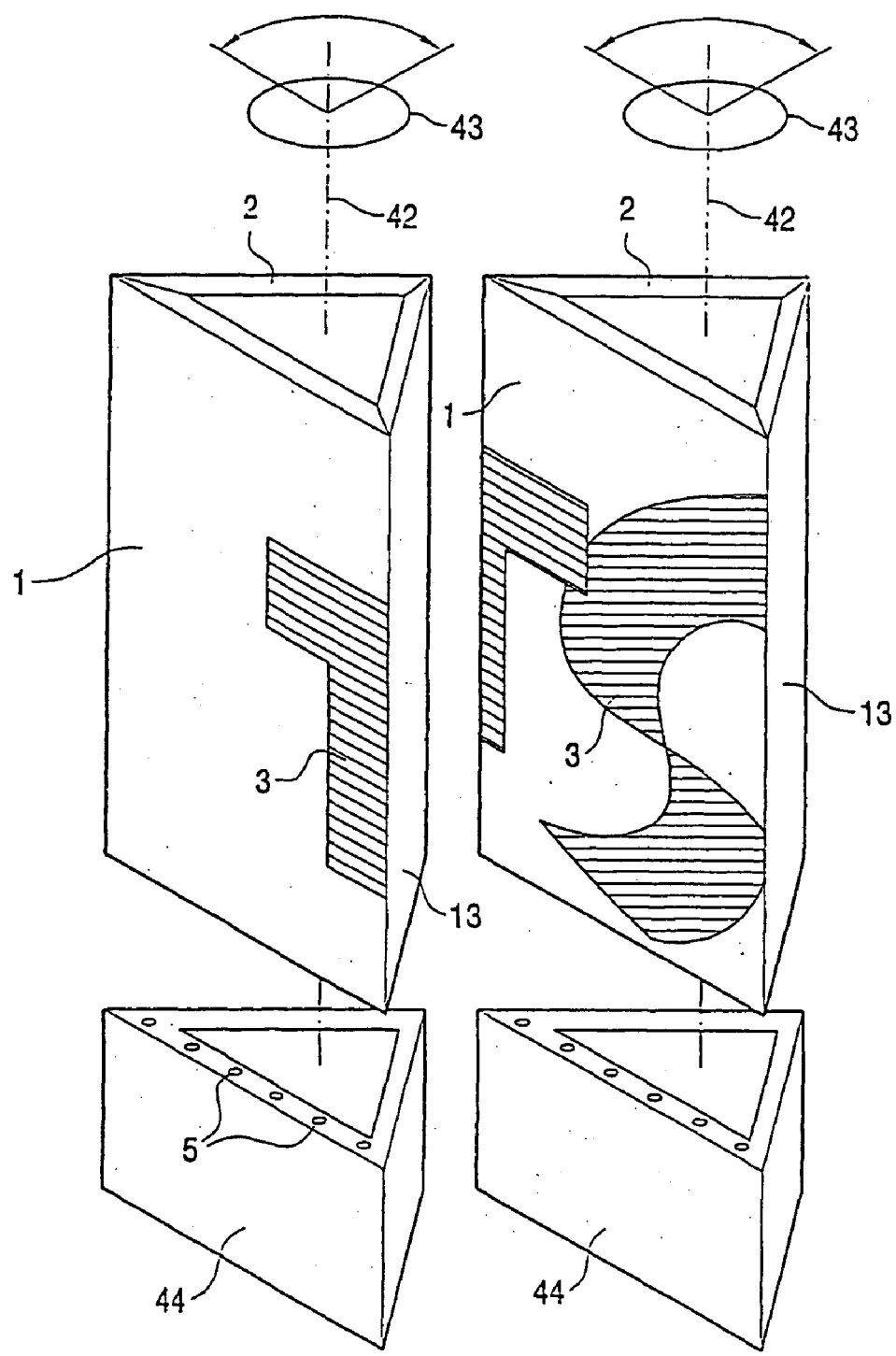
FIG. 38—a design of the device in the form of a set of prisms.
Figure 39:
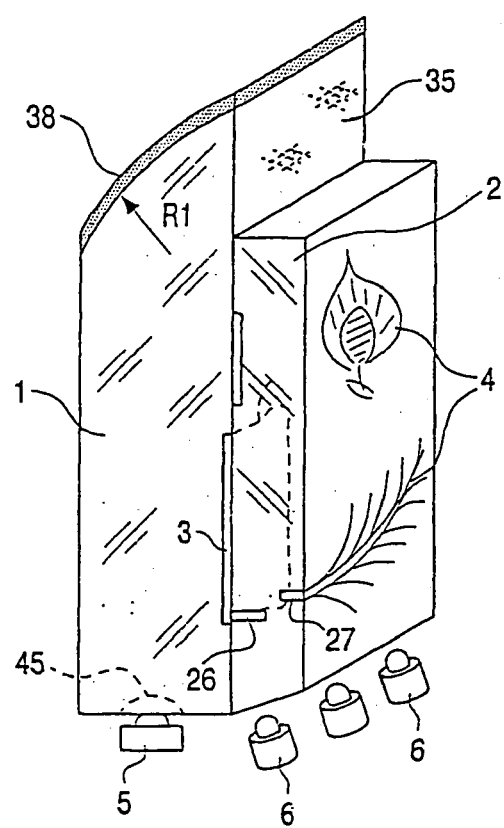
FIGS. 39–43—a design of the data display device in the form of a decorative luminary.
Figure 40:
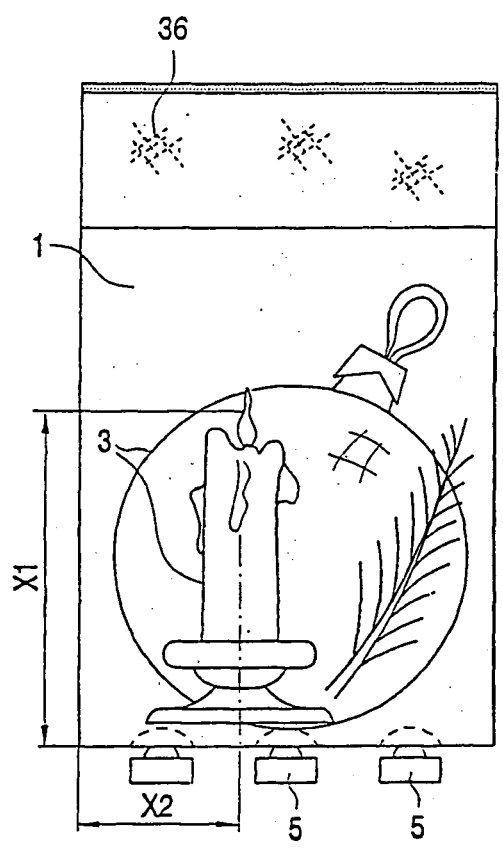

FIG. 38 shows the evolution of the concept of a polygonal prism as a light-guide element. In a device like a "prisma-tron", light-guide prisms are made hollow inside to form an equilateral triangle in the cross-section. Prisms, two or more in number, are assembled from light-guide rectangular plates 1, 2 and 13 which contain sets of characters 3 placed on all side surfaces thereof. In reference to their geometric axes 42, the prisms are mounted rotatable synchronously at 120°. The rotation is effected by means of kinematic links 43. According to the number of rotatable prisms (1, 2, 13), the sets of light diodes 5 are housed in boxes 44 which also contain the power-supply unit, motors for rotation and other equipment necessary to control a "prismatron". The full informative field is formed by means of uniting the characters 3 placed accordingly on the three faces of the prisms when they are combined into one plane after rotation.

Figure 41:
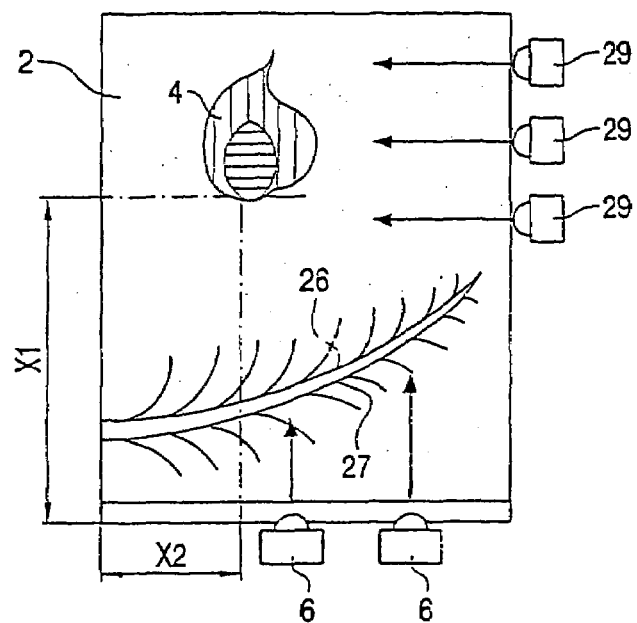
Figure 42:
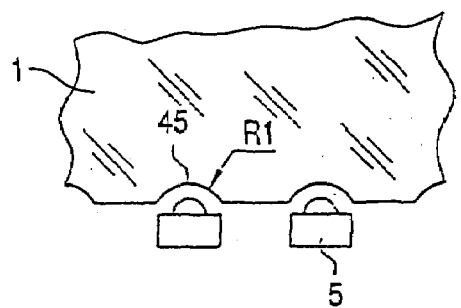
Figure 43:
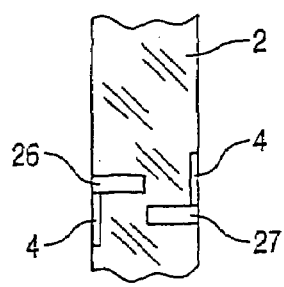

FIGS. 39 to 43 show a principal design of the data display device made in the form of a small-sized decorative luminary. This luminary consists of two light-guide elements 1 and 2 united into one unit. A set of characters 3 is placed on the surface of a plate 1 (FIGS. 39, 40) and characters 4 on the surface of a plate 2 (FIG. 41). In doing so, co-ordinates $X_1$ and $X_2$ of base points of the above characters 3 and 4 must be brought into coincidence. The surfaces of the light-guide element 2 are also furnished with two light-isolating grooves 26 and 27. The element 1 is illuminated with a set of light diodes 5 placed in sphere-like recessions 45 with the radius $R_1$ to widen the angle U of the radiation directivity diagram of the above light diodes 5. The light-guide element 2 is illuminated by a set of light diodes 6 and their interface with the element 2 is made skew in order to re-distribute light radiation. The surface 36 of the element 1 is made in the form of a frosting surface while the surface 38 is made in the form of a mirror reflective surface. The set of light diodes 29 is mated to the element 2 on the side and illuminates the character 4 (FIG. 41) where as the light isolation (grooves 26, 27) presents an objection to mixing light rays issued from the light diodes 6 and light diodes 29.

Figures 44, 45:
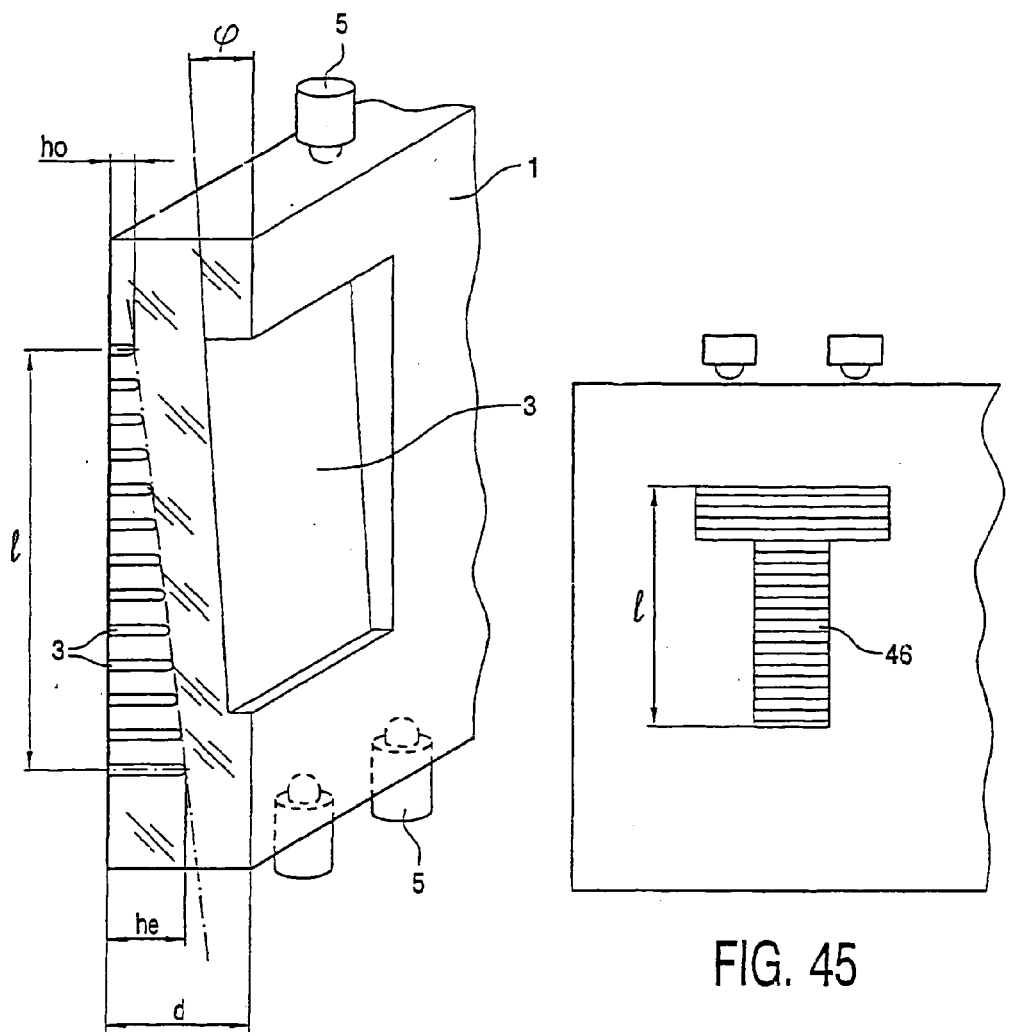
FIGS. 44–45—a cross-section of the light-guide plate with a variable thickness of engraved diffuse-reflective characters.

To solve the problem of how to ensure a uniform exposure of diffuse-reflective characters placed on big-sized light-guide elements, the characters 3 shown in FIGS. 44 and 45 are provided with a variable thickness of engraved character-generating lines 46. Degradation of illumination of the characters 3 (46) is first of all due to losses during multiple mirror reflections. As a consequence, the lines 46 of a variable thickness h enlarge the area of exposure to ensure uniformity of integral illumination of the entire character 3 along its whole length l.

Figure 46:
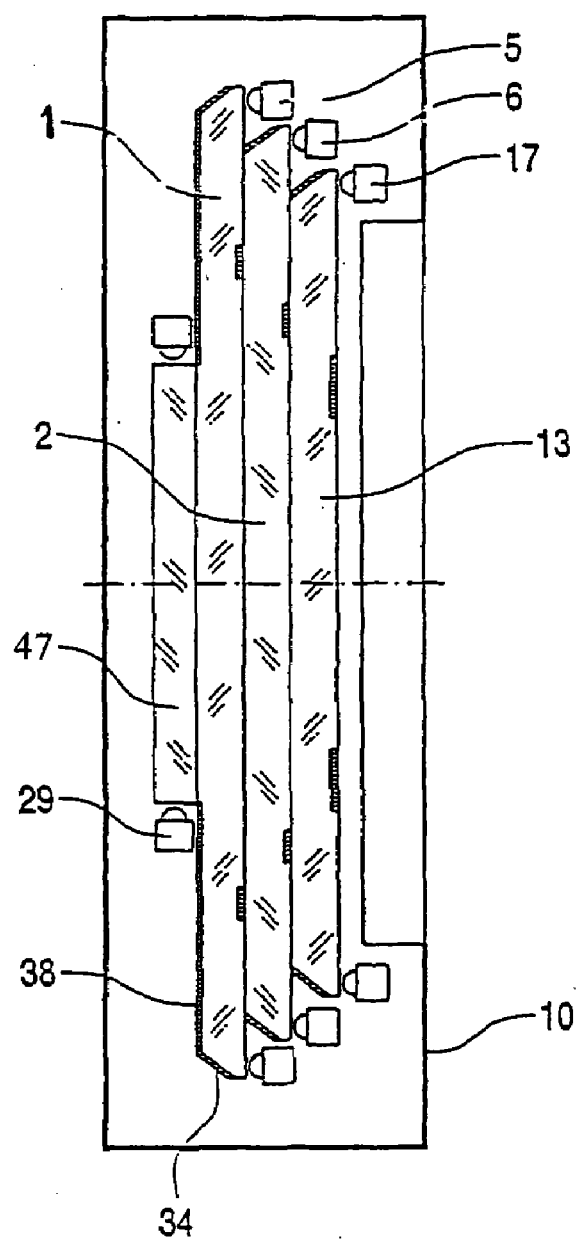
FIGS. 46–47—a design of the data display device in the form of a clock.
Figure 47:
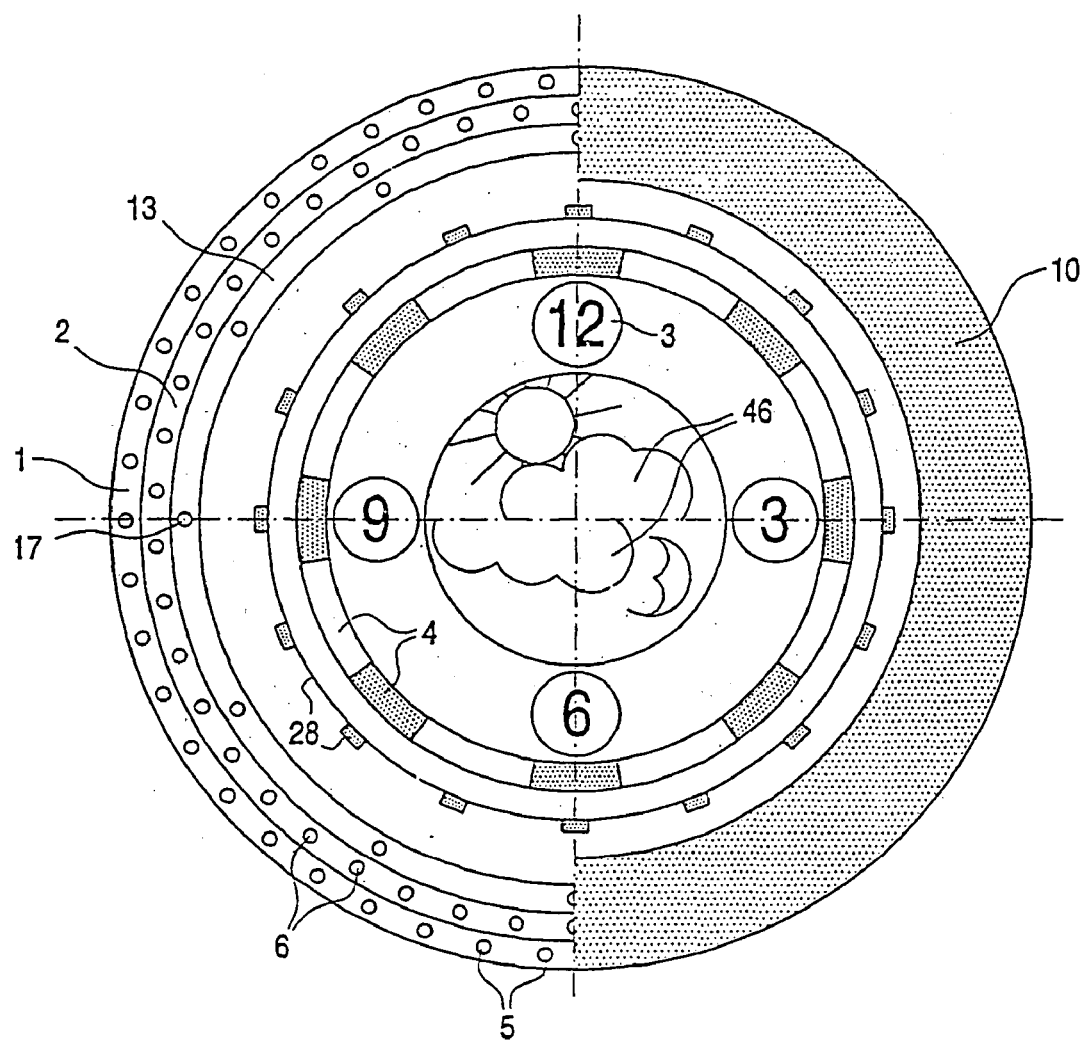

FIGS. 46 and 47 show a draft embodiment of the data display device in the form of a clock. This device comprises four light-guide discs 1, 2, 13 and 47 connected to four appropriate groups of light diodes 5, 6, 17 and 29. Here, the surfaces of the discs 1, 2, 13 and 47 are provided with characters 3 (an analogue to 'an hour of the day'), characters 4 (an analogue to 'minutes'), moveable characters 25 (an analogue to 'seconds') and characters 46 (an analogue to 'the first or the second half of the day' or to a firm's trade character). Discs 1, 2 and 13 have circularly positioned facets 34 to be illuminated by light diodes 5, 6 and 29. A mirror covering 38 is applied to the surface of the light-guide disc 1. All the elements of the device are housed in the casing 10.

Figure 48:
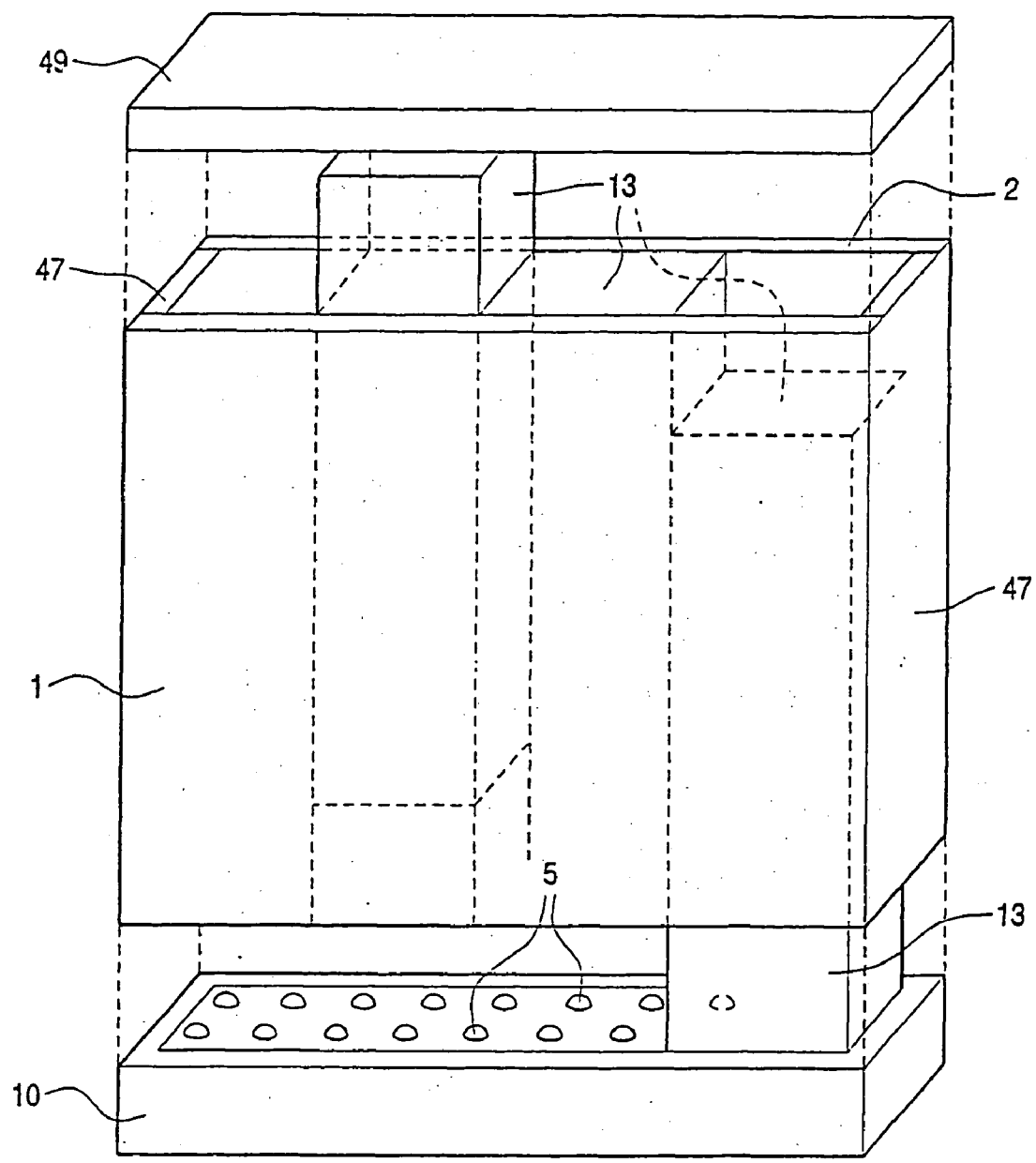
FIGS. 48–49—a design of the data display device with removable light-guide elements.
Figure 49:
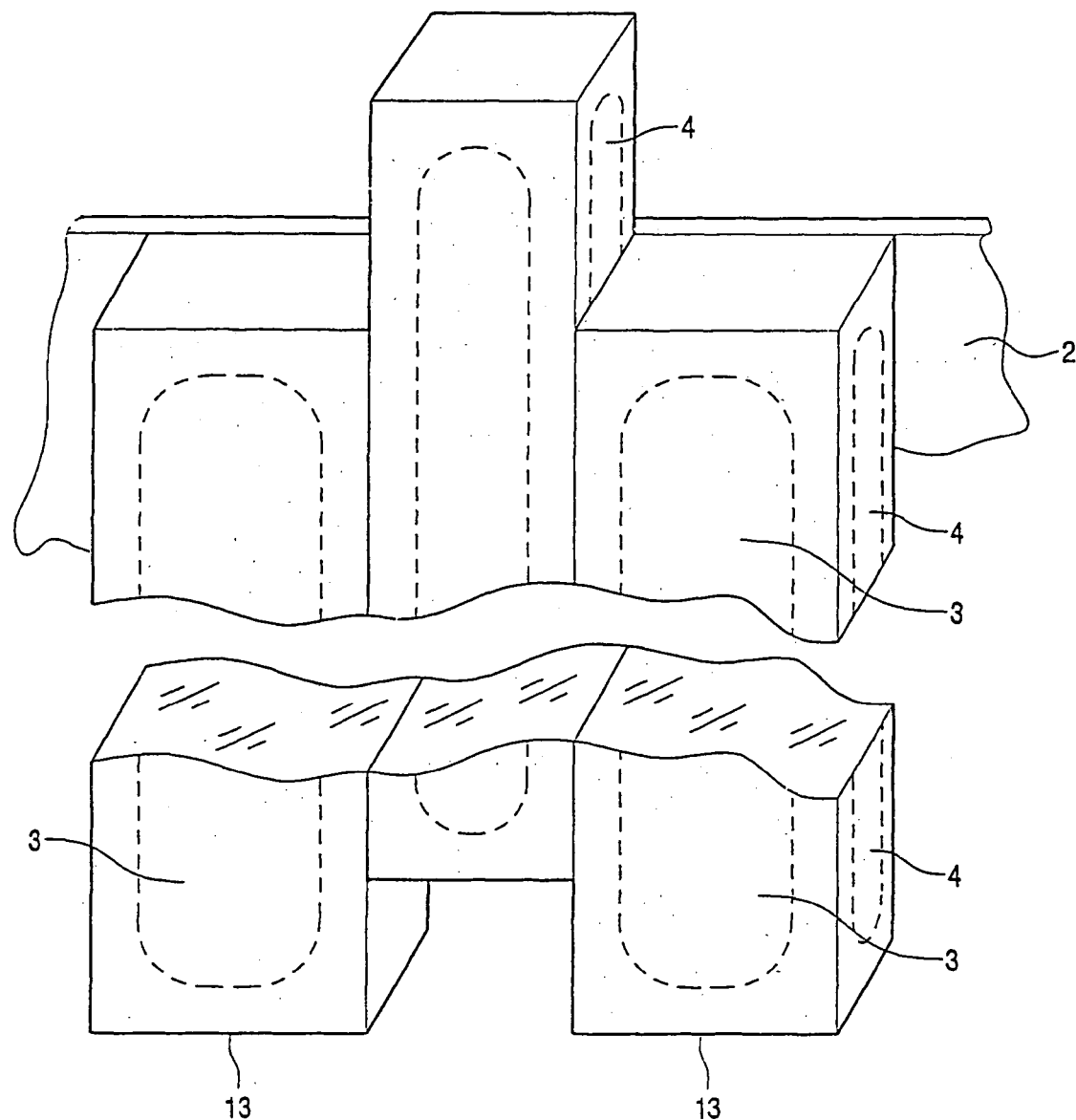

FIGS. 48 and 49 show the data display device in the form of an optically transparent duct made of light-guide plates 1, 2 and two side-members 47. Inside the duct are light-guide elements 46 in the form of parallelepipeds. Beneath the duct, the elements 1, 2 and 47 are mated to light diodes 5 in the casing 10. All light-guide parallelepipeds 13 are removable and allow for periodic renewal of information. From above, the device is provided with a protective removable housing 49.

Figure 50:
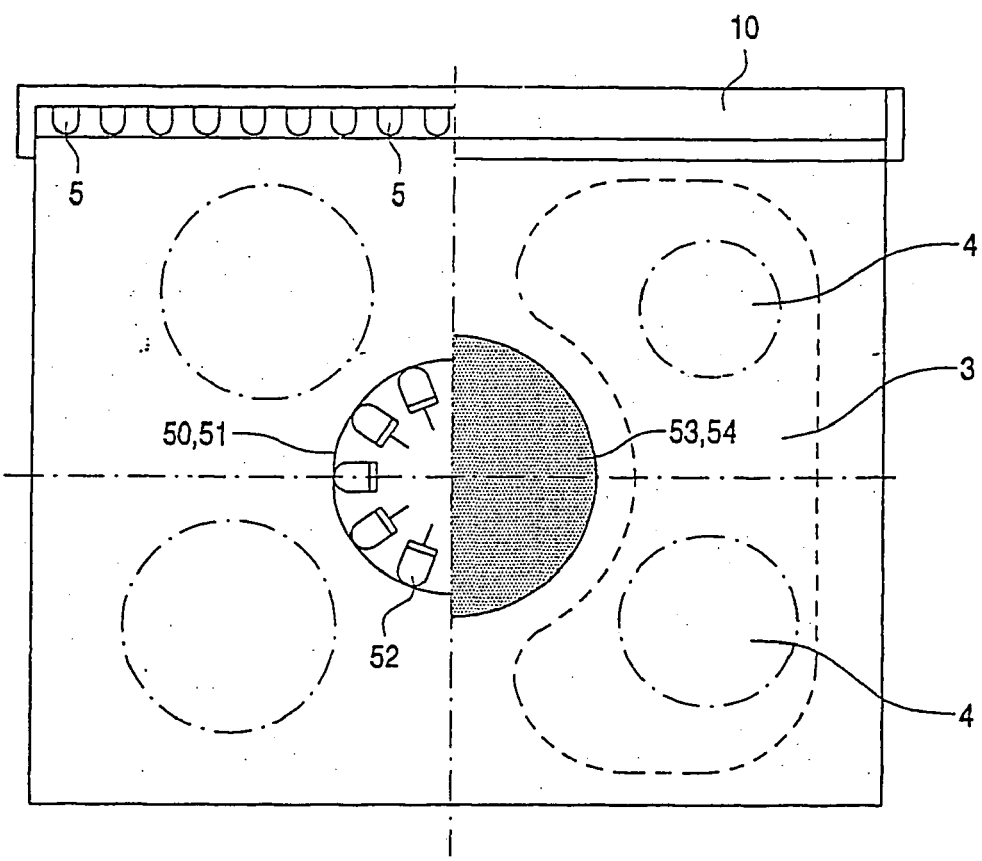
FIGS. 50–51—a design of the data display device having illumination from inside.
Figure 51:
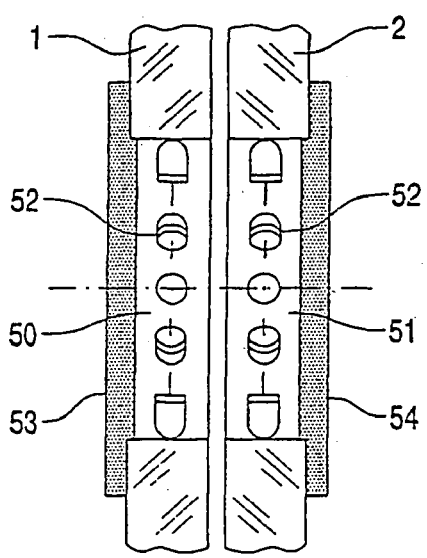

The data display device having central illumination is shown in FIGS. 50–51. The light-guide elements 1 and 2 having diffuse-reflecting characters 3 and 4 are provided with two coaxial holes 50–51 in the center. A set of light-diodes 52 is placed inside the holes 50, 51. The holes 50, 51 are covered with plugs 53, 54 on both sides.

Such features as light-guide elements of new shapes different from rectilinear ones, conformity of these elements and the use of point light sources ensure the creation of data display devices that possess dynamic modes of information delivery.

The invention claimed is:

1. A data display device including:
   a light-guide element made of an optically transparent material having at least two polished surfaces faced to one another, whereby at least one surface contains at least one gravure forming a diffuse-reflective character, and
   a light source arranged to illuminate said character
   wherein the device also includes:
   at least one additional light-guide element made of an optically transparent material having at least two polished surfaces faced to one another, whereby at least one surface contains at least one additional gravure forming an additional diffuse-reflective character, and
   at least one additional light source arranged to illuminate said additional diffuse-reflective character, wherein the at least one gravure and the at least one additional gravure form in aggregate an information unit;
   whereby said light-guide elements being mounted at a distance one from each another such that the minimum distance between the guide-elements exceeds the red-light wavelength and each light source is being optically isolated from each another, and wherein said light-guide elements are arranged to allow only an air gap to exist therebetween, and
   wherein one of the surfaces of one of the light-guide elements is roughened through a grinding process and a transparent film is fixed on the surface which is opposite to the roughened surface, such that the transparent film is arranged between at least two light-guide elements.

2. The device as claimed in claim 1, wherein each light source consists of multiple point light sources.

3. The device as claimed in claim 2, wherein the light-guide elements on the side of said light sources are made curvilinear, with curvature radiuses being no more than the thickness of the light-guide element.

4. The device as claimed in claim 2, wherein the point light sources are made in the form of solid state semiconductor light diodes arranged in groups according to radiation spectra.

5. The device as claimed in claim 2, wherein the device comprises an electronic programmed unit electrically connected to said point light sources to control said point light sources.

6. The device as claimed in claim 5, wherein the electronic programmed unit illuminates the point light sources sequentially.

7. The device as claimed in claim 1, wherein the light-guide elements are made curvilinear.

8. The device as claimed in claim 1, wherein the light produced by at least one light source is guided by multiple fiber-optical light guides to the corresponding light-guide element.

9. The device as claimed in claim 1, wherein the surface of light-guide elements on the side of the light sources is made skew at an angle $\phi = 90° \pm A$, where A is an angular parameter selected from the range of values $0° \leq A \leq U/2$,
  where U is an angle of the radiation directivity diagram of the light sources, and
  where $\phi$ is substantially within a range of 67.5° to 112.5°.

10. The device as claimed in claim 1, wherein it is provided with an additional light source for front-end illumination of the diffuse-reflective characters.

11. The device as claimed in claim 1, wherein at least one light-guide element on the side of the diffuse-reflective characters is furnished with grooves positioned substantially across light beams issued from the light sources.

12. The device as claimed in claim 1, wherein at least one light-guide element is made in the form of a polygonal prism.

13. The device as claimed in claim 12, wherein said light-guide element is made in the form of a set of trigonal prisms rotatable in-phase around the geometrical axis in reference to the light sources.

14. The device as claimed in claim 1, wherein a side of the light-guide element, opposite to a side of the light-guide element provided with the gravure, is provided with a mirror-reflective covering.

15. The device as claimed in claim 1, wherein in the device there are provided light-guide elements of laminar shape mounted with a gap opposite each other and additional replaceable light-guide elements made of an optically transparent material in the form of parallelepipeds having polished facets, with diffuse-reflective characters being formed on them and said parallelepipeds mounted in said gap being in optical contact with the light-guide elements.

16. The device as claimed in claim 1, wherein in the center of at least one of the light-guide elements there are made holes having polished cylindrical surfaces which are optically coupled with a set of light diodes irradiating white light.

* * * * *